United States Patent
Shahbazi

(10) Patent No.: US 8,495,700 B2
(45) Date of Patent: Jul. 23, 2013

(54) MOBILE DATA SECURITY SYSTEM AND METHODS

(75) Inventor: Majid Shahbazi, Fairfax, VA (US)

(73) Assignee: McAfee, Inc., Santa Clara, CA (US)

( * ) Notice: Subject to any disclaimer, the term of this patent is extended or adjusted under 35 U.S.C. 154(b) by 1160 days.

(21) Appl. No.: 11/363,283

(22) Filed: Feb. 28, 2006

(65) Prior Publication Data

US 2006/0224742 A1 Oct. 5, 2006

Related U.S. Application Data

(60) Provisional application No. 60/656,541, filed on Feb. 28, 2005.

(51) Int. Cl.
*H04L 29/06* (2006.01)

(52) U.S. Cl.
USPC ............... 726/1; 380/247; 380/274; 455/410; 455/411

(58) Field of Classification Search
USPC ....... 726/1, 3, 11, 12, 29, 35; 455/556.1–559, 455/565, 466, 26.1, 426.2, 442, 410–411; 380/247–274, 201, 30; 713/168, 201, 189, 713/182, 151, 152, 155, 175, 200; 709/223, 709/201, 224–225, 203; 370/328, 395.21, 370/392; 345/764, 840
See application file for complete search history.

(56) References Cited

U.S. PATENT DOCUMENTS

| | | | |
|---|---|---|---|
| 5,727,202 A | 3/1998 | Kucala | |
| 5,884,323 A | 3/1999 | Hawkins et al. | |
| 5,987,610 A | 11/1999 | Franczek et al. | |
| 6,000,000 A | 12/1999 | Hawkins et al. | |
| 6,006,274 A | 12/1999 | Hawkins et al. | |
| 6,073,142 A | 6/2000 | Geiger et al. | |
| 6,158,010 A | 12/2000 | Moriconi et al. | |
| 6,301,484 B1 | 10/2001 | Rogers et al. | |
| 6,317,868 B1 | 11/2001 | Grimm et al. | |
| 6,460,050 B1 | 10/2002 | Pace et al. | |
| 6,661,780 B2 | 12/2003 | Li | |
| 6,678,827 B1 | 1/2004 | Rothermel | |
| 6,684,244 B1 | 1/2004 | Goldman et al. | |

(Continued)

FOREIGN PATENT DOCUMENTS

| AU | 2003260071 | 3/2004 |
|---|---|---|
| EP | 0661677 | 7/1995 |

(Continued)

OTHER PUBLICATIONS

Debabrata Nayak et al. "Security Issues in Mobile Data Networks." Vehicular Technology Conference, 2004. VTC2004-Fall. 2004. IEEE 60th. vol. 5, pp. 3229-3233.*

(Continued)

*Primary Examiner* — Taghi Arani
*Assistant Examiner* — Narciso Victoria
(74) *Attorney, Agent, or Firm* — Patent Capital Group

(57) ABSTRACT

The present invention is directed to security systems and methods for mobile network-based data environments. The present invention provides an integration of security, mobile computing, wireless and IT infrastructure management technology, to create a new level of automation and enforcement to enable the transparent application of mobile security across an enterprise, while embracing end user "transparency" and "ease of use" and empowering IT administration.

37 Claims, 9 Drawing Sheets

U.S. PATENT DOCUMENTS

| | | | |
|---|---|---|---|
| 6,694,434 B1 * | 2/2004 | McGee et al. | 713/189 |
| 6,766,165 B2 | 7/2004 | Sharma et al. | |
| 6,798,757 B2 | 9/2004 | Mizutani | |
| 6,804,722 B1 | 10/2004 | Nishi | |
| 6,839,766 B1 | 1/2005 | Parnafes et al. | |
| 6,944,183 B1 | 9/2005 | Iyer et al. | |
| 6,954,790 B2 | 10/2005 | Forslow | |
| 6,973,488 B1 | 12/2005 | Yavatkar et al. | |
| 7,003,562 B2 | 2/2006 | Mayer | |
| 7,089,592 B2 * | 8/2006 | Adjaoute | 726/25 |
| 7,103,772 B2 * | 9/2006 | Jorgensen et al. | 713/168 |
| 7,136,645 B2 | 11/2006 | Hanson et al. | |
| 7,136,907 B1 | 11/2006 | Nordstrom et al. | |
| 7,194,689 B2 | 3/2007 | Manni et al. | |
| 7,222,359 B2 | 5/2007 | Freund et al. | |
| 7,249,369 B2 | 7/2007 | Knouse et al. | |
| 7,308,703 B2 * | 12/2007 | Wright et al. | 726/1 |
| 7,317,699 B2 | 1/2008 | Godfrey et al. | |
| 7,346,340 B2 | 3/2008 | Purnadi et al. | |
| 7,386,888 B2 * | 6/2008 | Liang et al. | 726/23 |
| 7,428,583 B1 | 9/2008 | Lortz et al. | |
| 7,448,067 B2 | 11/2008 | Yadav | |
| 7,506,155 B1 | 3/2009 | Stewart et al. | |
| 7,546,629 B2 | 6/2009 | Albert et al. | |
| 7,562,388 B2 | 7/2009 | Hackenberger et al. | |
| 7,574,208 B2 * | 8/2009 | Hanson et al. | 455/435.1 |
| 7,665,118 B2 * | 2/2010 | Mann et al. | 726/1 |
| 7,669,237 B2 | 2/2010 | Shahbazi | |
| 7,734,284 B2 | 6/2010 | Adams et al. | |
| 7,774,363 B2 | 8/2010 | Lim | |
| 7,774,504 B2 | 8/2010 | Chene et al. | |
| 7,853,998 B2 | 12/2010 | Blaisdell et al. | |
| 7,865,938 B2 | 1/2011 | Shahbazi | |
| 7,971,232 B2 | 6/2011 | Hasbun | |
| 8,010,997 B2 | 8/2011 | Limont et al. | |
| 8,131,851 B2 | 3/2012 | Harlow | |
| 8,134,954 B2 | 3/2012 | Godfrey et al. | |
| 8,259,568 B2 | 9/2012 | Laudermilch et al. | |
| 8,259,611 B2 | 9/2012 | Godfrey et al. | |
| 8,341,693 B2 | 12/2012 | Shahbazi | |
| 2001/0039624 A1 | 11/2001 | Kellum | |
| 2001/0041576 A1 | 11/2001 | I'Anson et al. | |
| 2002/0027569 A1 * | 3/2002 | Manni et al. | 345/764 |
| 2002/0032853 A1 | 3/2002 | Preston et al. | |
| 2002/0068559 A1 | 6/2002 | Sharma et al. | |
| 2002/0098830 A1 | 7/2002 | Lauper et al. | |
| 2002/0098840 A1 | 7/2002 | Hanson et al. | |
| 2002/0120599 A1 | 8/2002 | Knouse et al. | |
| 2002/0184532 A1 | 12/2002 | Hackenberger et al. | |
| 2002/0194317 A1 | 12/2002 | Kanada et al. | |
| 2003/0028651 A1 | 2/2003 | Schreckengast et al. | |
| 2003/0037129 A1 | 2/2003 | Beadles et al. | |
| 2003/0081621 A1 | 5/2003 | Godfrey et al. | |
| 2003/0108015 A1 | 6/2003 | Li | |
| 2003/0130953 A1 | 7/2003 | Narasimhan et al. | |
| 2003/0140246 A1 | 7/2003 | Kammer et al. | |
| 2003/0162555 A1 | 8/2003 | Loveland | |
| 2003/0167405 A1 | 9/2003 | Freund et al. | |
| 2003/0177389 A1 | 9/2003 | Albert et al. | |
| 2003/0182394 A1 | 9/2003 | Ryngler et al. | |
| 2003/0228866 A1 | 12/2003 | Pezeshki | |
| 2004/0009768 A1 | 1/2004 | Waters et al. | |
| 2004/0022258 A1 | 2/2004 | Tsukada et al. | |
| 2004/0030705 A1 | 2/2004 | Bowman-Amuah | |
| 2004/0030796 A1 | 2/2004 | Cooper et al. | |
| 2004/0043762 A1 | 3/2004 | Kim et al. | |
| 2004/0064727 A1 | 4/2004 | Yadav | |
| 2004/0076128 A1 | 4/2004 | Rao et al. | |
| 2004/0083382 A1 | 4/2004 | Markham et al. | |
| 2004/0123150 A1 | 6/2004 | Wright et al. | |
| 2004/0128394 A1 | 7/2004 | Knauerhase et al. | |
| 2004/0179690 A1 | 9/2004 | Soliman | |
| 2004/0214570 A1 | 10/2004 | Zhang et al. | |
| 2004/0225524 A1 | 11/2004 | Narasimhan et al. | |
| 2004/0266395 A1 | 12/2004 | Pailles et al. | |
| 2004/0268145 A1 | 12/2004 | Watkins et al. | |
| 2005/0022012 A1 | 1/2005 | Bluestone et al. | |
| 2005/0055578 A1 | 3/2005 | Wright et al. | |
| 2005/0060393 A1 | 3/2005 | Parnafes et al. | |
| 2005/0097199 A1 | 5/2005 | Woodard et al. | |
| 2005/0101293 A1 | 5/2005 | Mentze et al. | |
| 2005/0135375 A1 | 6/2005 | Hurtta et al. | |
| 2005/0164691 A1 | 7/2005 | Payne | |
| 2005/0198306 A1 | 9/2005 | Palojarvi et al. | |
| 2005/0203881 A1 * | 9/2005 | Sakamoto et al. | 707/3 |
| 2005/0251853 A1 | 11/2005 | Bhargavan et al. | |
| 2005/0254652 A1 | 11/2005 | Engler et al. | |
| 2005/0255838 A1 | 11/2005 | Adams et al. | |
| 2005/0257246 A1 | 11/2005 | Adams et al. | |
| 2005/0262343 A1 | 11/2005 | Jorgensen et al. | |
| 2005/0268326 A1 | 12/2005 | Bhargavan et al. | |
| 2006/0005254 A1 | 1/2006 | Ross | |
| 2006/0031351 A1 | 2/2006 | Marston et al. | |
| 2006/0036730 A1 | 2/2006 | Graham et al. | |
| 2006/0075472 A1 | 4/2006 | Sanda et al. | |
| 2006/0089938 A1 | 4/2006 | Leonard et al. | |
| 2006/0095953 A1 | 5/2006 | Frank | |
| 2006/0112427 A1 | 5/2006 | Shahbazi | |
| 2006/0130139 A1 * | 6/2006 | Sobel et al. | 726/22 |
| 2006/0141995 A1 | 6/2006 | Purnadi et al. | |
| 2006/0161646 A1 | 7/2006 | Chene et al. | |
| 2006/0184490 A1 | 8/2006 | Heim et al. | |
| 2006/0190684 A1 | 8/2006 | McCammon et al. | |
| 2006/0190984 A1 * | 8/2006 | Heard et al. | 726/1 |
| 2006/0277590 A1 | 12/2006 | Limot et al. | |
| 2007/0006289 A1 | 1/2007 | Limot et al. | |
| 2007/0088948 A1 | 4/2007 | Ji et al. | |
| 2007/0143824 A1 | 6/2007 | Shahbazi | |
| 2007/0156670 A1 | 7/2007 | Lim | |
| 2007/0156694 A1 | 7/2007 | Lim | |
| 2007/0157287 A1 | 7/2007 | Lim | |
| 2007/0157288 A1 | 7/2007 | Lim | |
| 2007/0169168 A1 | 7/2007 | Lim | |
| 2007/0186275 A1 | 8/2007 | Shahbazi | |
| 2007/0266422 A1 | 11/2007 | Germano et al. | |
| 2008/0034401 A1 | 2/2008 | Wang | |
| 2008/0052383 A1 | 2/2008 | O'Shaughnessy et al. | |
| 2008/0065700 A1 | 3/2008 | Lim | |
| 2008/0066149 A1 | 3/2008 | Lim | |
| 2008/0070495 A1 | 3/2008 | Stricklen et al. | |
| 2008/0098062 A1 | 4/2008 | Balia | |
| 2008/0125102 A1 | 5/2008 | Abel et al. | |
| 2008/0137593 A1 | 6/2008 | Laudermilch et al. | |
| 2008/0184200 A1 | 7/2008 | Burns et al. | |
| 2008/0184201 A1 | 7/2008 | Burns et al. | |
| 2008/0184277 A1 | 7/2008 | Burns et al. | |
| 2008/0209505 A1 | 8/2008 | Ghai et al. | |
| 2009/0049166 A1 | 2/2009 | Roman et al. | |
| 2009/0049518 A1 | 2/2009 | Roman et al. | |
| 2009/0138939 A1 | 5/2009 | Kumar et al. | |
| 2009/0164560 A1 | 6/2009 | Fiatal | |
| 2009/0265754 A1 | 10/2009 | Hinds | |
| 2009/0298478 A1 | 12/2009 | Tyhurst et al. | |
| 2009/0322890 A1 | 12/2009 | Bocking et al. | |
| 2010/0037088 A1 | 2/2010 | Krivopaltsev et al. | |
| 2010/0064341 A1 | 3/2010 | Aldera | |
| 2010/0112983 A1 | 5/2010 | Walker et al. | |
| 2010/0115581 A1 | 5/2010 | Goldschlag et al. | |
| 2010/0115582 A1 | 5/2010 | Sapp et al. | |
| 2010/0154025 A1 | 6/2010 | Esteve Balducci et al. | |
| 2010/0191847 A1 | 7/2010 | Raleigh | |
| 2011/0004913 A1 | 1/2011 | Nagarajan et al. | |
| 2011/0162049 A1 | 6/2011 | Shahbazi | |
| 2011/0167470 A1 | 7/2011 | Walker et al. | |
| 2011/0276683 A1 | 11/2011 | Goldschlag et al. | |
| 2011/0320819 A1 | 12/2011 | Weber et al. | |
| 2012/0270522 A1 | 10/2012 | Laudermilch et al. | |
| 2012/0270523 A1 | 10/2012 | Laudermilch et al. | |
| 2013/0047219 A1 | 2/2013 | Shahbazi | |

FOREIGN PATENT DOCUMENTS

| | | |
|---|---|---|
| EP | 1041506 | 10/2000 |
| EP | 1540446 | 6/2005 |
| EP | 1709556 | 7/2005 |
| EP | 1866789 | 12/2007 |
| EP | 2345205 | 7/2011 |
| GB | 1 496 984 A | 12/1975 |

| | | |
|---|---|---|
| WO | WO 02/19116 A2 | 3/2002 |
| WO | WO 02/44892 | 6/2002 |
| WO | WO 03/027878 A1 | 4/2003 |
| WO | WO 03/090492 A1 | 10/2003 |
| WO | WO 2004/021114 A2 | 3/2004 |
| WO | WO 2004/057834 A2 | 7/2004 |
| WO | WO2005064498 | 7/2005 |
| WO | WO2005107144 | 11/2005 |
| WO | WO 2006/093917 A2 | 9/2006 |
| WO | WO 2007/073278 A2 | 6/2007 |
| WO | WO 2008/109866 | 9/2008 |
| WO | WO 2010/054258 A1 | 5/2010 |

OTHER PUBLICATIONS

The International Search Report for International application No. PCT/US 06/06968.
Smith, Randy F., "Tracking Logon and Logoff Activity in Windows 2000", Feb. 2001, Microsoft TechNet, http://www.microsoft.com/technet/prodtechnol/windows2000serv/maintain/monitor/logonoff.mspx (printed Jul. 1, 2010, © 2010).
International Search Report for International Application No. PCT/US03/26645 mailed Feb. 13, 2004 (3 pages).
International Preliminary Examination Report for International Application No. PCT/US03/26645 completed Mar. 3, 2005 (6 pages).
International Preliminary Examination Report for International Application No. PCT/US04/42565 mailed Jul. 17, 2006 (7 pages).
Written Opinion of the International Searching Authority for International Application No. PCT/US04/42565 mailed May 25, 2005 (6 pages).
International Search Report for International Application No. PCT/US04/42565 mailed May 25, 2005 (1 page).
International Preliminary Report on Patentability issued Mar. 24, 2009 (1 page) and Written Opinion of the International Searching Authority mailed Feb. 29, 2008 (4 pages) for International Application No. PCT/US06/06968.
International Search Report for International Application No. PCT/US2009/063640 mailed Apr. 20, 2010 (6 pages).
Supplementary European Search Report for EPO Application No. EP 04 81 4713 completed Apr. 25, 2007.
"Face-Image Capturing Method for Unattended Terminal", IBM Technical Disclosure Bulletin, IBM Corporation, New York, US, vol. 38, No. 1, Jan. 1995 (Jan. 1995), pp. 101-102, XP000498703 ISSN: 0018-8689.
U.S. Appl. No. 12/972,410, filed Dec. 17, 2010, entitled "Enterprise-Wide Security System for Computer Devices," Inventor Majid Shahbazi.
USPTO Aug. 6, 2010 Nonfinal Office Action from U.S. Appl. No. 11/877,656.
USPTO Nov. 8, 2010 Response to Aug. 6, 2010 Nonfinal Office Action from U.S. Appl. No. 11/877,656.
USPTO Sep. 16, 2010 Nonfinal Office Action from U.S. Appl. No. 11/578,420.
USPTO Dec. 16, 2010 Response to Sep. 16, 2010 Nonfinal Office Action from U.S. Appl. No. 11/578,420.
USPTO Mar. 1, 2011 Final Office Action from U.S. Appl. No. 11/877,656.
USPTO Jun. 1, 2011 RCE Response to Mar. 1, 2011 Final Office Action from U.S. Appl. No. 11/877,656.
USPTO Mar. 4, 2011 Final Office Action from U.S. Appl. No. 11/578,420.
USPTO Jun. 6, 2011 RCE Response to Mar. 4, 2011 Final Office Action from U.S. Appl. No. 11/578,420.
May 19, 2011 International Preliminary Report on Patentability for International Application No. PCT/US2009/063640.
May 30, 2011 Replacement International Search Report for Application No. 04814713.6-1238/1709556.
European Patent Office Office Action dated Jun. 15, 2011 in EP Application No. 09759830.4-1244 PCT/US2009063640.
European Patent Office Office Action dated Sep. 29, 2011 in EP Application No. 04814713.6.
Non-Final Office Action in U.S. Appl. No. 10/527,235 mailed on Jun. 28, 2006.
Response to Non-Final Office Action dated Jun. 28, 2006 in U.S. Appl. No. 10/527,235 filed on Sep. 28, 2006.
Final Office Action in U.S. Appl. No. 10/527,235 mailed on Dec. 12, 2006.
Request for Continued Examination and Amendment in U.S. Appl. No. 10/527,235 filed on Jun. 12, 2007.
Non-Final Office Action in U.S. Appl. No. 10/527,235 mailed on Aug. 28, 2007.
Response to Non-Final Office Action dated Aug. 28, 2007 in U.S. Appl. No. 10/527,235 filed on Feb. 28, 2008.
Final Office Action in U.S. Appl. No. 10/527,235 mailed on Jul. 11, 2008.
Request for Continued Examination and Amendment in U.S. Appl. No. 10/527,235 filed on Dec. 11, 2008.
Non-Final Office Action in U.S. Appl. No. 10/527,235 mailed on Jan. 9, 2009.
Response to Non-Final Office Action dated Jan. 9, 2009 in U.S. Appl. No. 10/527,235 filed on Jul. 9, 2009.
Notice of Allowance in U.S. Appl. No. 10/527,235 mailed on Oct. 5, 2009.
Non-Final Office Action in U.S. Appl. No. 11/441,049 mailed on Oct. 17, 2006.
Response to Non-Final Office Action dated Oct. 17, 2006 in U.S. Appl. No. 11/441,049 filed on Jan. 17, 2007.
Final Office Action in U.S. Appl. No. 11/441,049 mailed on Mar. 22, 2007.
Request for Continued Examination and Amendment in U.S. Appl. No. 11/441,049 filed on Jun. 22, 2007.
Non-Final Office Action in U.S. Appl. No. 11/441,049 mailed on Sep. 24, 2007.
Response to Non-Final Office Action dated Sep. 24, 2007 in U.S. Appl. No. 11/441,049 filed on Mar. 24, 2008.
Final Office Action in U.S. Appl. No. 11/441,049 mailed on Jul. 9, 2008.
Request for Continued Examination and Amendment in U.S. Appl. No. 11/441,049 filed on Jan. 9, 2009.
Non-Final Office Action in U.S. Appl. No. 11/441,049 mailed on Feb. 2, 2009.
Examiner Interview Summary in U.S. Appl. No. 11/441,049 mailed on Jul. 27, 2009.
Response to Non-Final Office Action dated Feb. 2, 2009 in U.S. Appl. No. 11/441,049 filed on Aug. 27, 2009.
Non-Final Office Action in U.S. Appl. No. 11/441,049 mailed on Dec. 10, 2009.
Response to Non-Final Office Action dated Dec. 10, 2009 in U.S. Appl. No. 11/441,049 filed on Jun. 10, 2010.
Examiner Interview Summary in U.S. Appl. No. 11/441,049 mailed on Jun. 14, 2010.
Notice of Allowance in U.S. Appl. No. 11/441,049 mailed on Aug. 23, 2010.
Non-Final Office Action in U.S. Appl. No. 12/972,410 mailed on Sep. 21, 2011.
Non-Final Office Action and Examiner Interview Summary in U.S. Appl. No. 11/578,420 mailed on Jun. 22, 2011.
Response to Non-Final Office Action dated Jun. 22, 2011 in U.S. Appl. No. 11/578,420 filed Sep. 21, 2011.
Notice of Allowance in U.S. Appl. No. 11/877,656 mailed on Jul. 12, 2011.
Request for Continued Examination and Amendment in U.S. Appl. No. 11/877,656 filed on Sep. 22, 2011.
Notice of Allowance in U.S. Appl. No. 11/877,656 mailed on Oct. 5, 2011.
U.S. Appl. No. 12/830,831, filed on Jul. 6, 2011.
U.S. Appl. No. 13/102,627, filed on May 6, 2011.
"Can You Manage an iPhone Like a BlackBerry?", Network World Middle East, Copyright IDG Middle East, Jul. 9, 2009 (3 pages).
"GuardianEdge Releases Smartphone Protection Product", ComputerTechnology Review, Nov. 28, 2007 (1 page).
PCT Written Opinion in International Application U.S. Appl. No. PCT/US03/26645 mailed on Jan. 21, 2005 (7 Pages).
Response to Non-Final Office Action in U.S. Appl. No. 12/972,410 filed on Dec. 21, 2011.

Final Office Action in U.S. Appl. No. 12/972,410 mailed on Mar. 7, 2012.
Non-Final Office Action in U.S. Appl. No. 11/578,420 mailed on Dec. 1, 2011.
Response to Non-Final Office Action dated Dec. 1, 2011 in U.S. Appl. No. 11/578,420, filed on Mar. 1, 2012.
Request for Continued Examination in U.S. Appl. No. 11/877,656, filed on Jan. 4, 2012.
Notice of Allowance in U.S. Appl. No. 11/877,656 mailed on Jan. 24, 2012.
Request for Continued Examination in U.S. Appl. No. 11/877,656, filed Mar. 14, 2012.
Notice of Allowance in U.S. Appl. No. 11/877,656 mailed on Mar. 29, 2012.
Non-Final Office Action in U.S. Appl. No. 12/614,319 mailed on Apr. 19, 2012.
Non-Final Office Action in U.S. Appl. No. 12/614,326 mailed on Dec. 16, 2011.
Response to Non-Final Office Action dated Dec. 16, 2011 in U.S. Appl. No. 12/614,326, filed Mar. 16, 2012.
Non-Final Office Action in U.S. Appl. No. 12/614,333 mailed on Mar. 28, 2012.
U.S. Appl. No. 12/830,861, filed Jul. 6, 2010 and entitled "Mobile Data Security System and Methods".
Request for Continued Examination and Amendment in U.S. Appl. No. 11/441,049, filed Aug. 14, 2012.
Request for Continued Examination in U.S. Appl. No. 11/578,420, filed Dec. 21, 2012.
Request for Continued Examination and Amendment in U.S. Appl. No. 11/441,049, filed on Aug. 14, 2012.
Request for Continued Examination and Amendment in U.S. Appl. No. 12/972,410, filed Jun. 7, 2012.
Notice of Allowance in U.S. Appl. No. 12/972,410 mailed on Jun. 25, 2012.
Request for Continued Examination in U.S. Appl. No. 12/972,410, filed Sep. 23, 2012.
Notice of Allowance in U.S. Appl. No. 12/972,410 mailed on Oct. 17, 2012.
U.S. Appl. No. 13/630,830, filed Sep. 28, 2012 entitled "Enterprise-Wide Security System for Computer Devices", Inventor, Majid Shahbazi.
Final Office Action in U.S. Appl. No. 11/578,420 mailed on May 14, 2012.
Request for Continued Examination and Amendment in U.S. Appl. No. 11/578,420, filed Aug. 14, 2012.
Notice of Allowance in U.S. Appl. No. 11/578,420 mailed on Sep. 26, 2012.
Request for Continued Examination in U.S. Appl. No. 11/877,656, filed Jun. 29, 2012.
Notice of Allowance in U.S. Appl. No. 11/877,656 mailed on Jul. 20, 2012.
U.S. Appl. No. 13/459,213, filed Apr. 29, 2012, entitled "System and Method for Controlling Mobile Device Access to a Network"; inventors Norm Laudermilch et al.
Non-Final Office Action in U.S. Appl. No. 13/459,213 mailed on Dec. 17, 2012.
U.S. Appl. No. 13/459,216, filed Apr. 29, 2012, entitled "System and Method for Controlling Mobile Device Access to a Network"; inventors Norm Laudermilch et al.
Non-Final Office Action in U.S. Appl. No. 13/459,216 mailed on Dec. 7, 2012.
Response to Non-Final Office Action dated Apr. 19, 2012 in U.S. Appl. No. 12/614,319, filed Jun. 22, 2012.
Final Office Action in U.S. Appl. No. 12/614,319 mailed on Sep. 20, 2012.
Request for Continued Examination and Amendment in U.S. Appl. No. 12/614,319, filed Nov. 28, 2012.
Final Office Action in U.S. Appl. No. 12/614,326 mailed on May 10, 2012.
Request for Continued Examination and Amendment in U.S. Appl. No. 12/614,326, filed Aug. 10, 2012.
Non-Final Office Action in U.S. Appl. No. 12/614,326 mailed on Dec. 12, 2012.
Response to Non-Final Office Action dated Mar. 28, 2012 in U.S. Appl. No. 12/614,333, filed May 29, 2012.
Final Office Action in U.S. Appl. No. 12/614,333 mailed on Aug. 01, 2012.
Request for Continued Examination and Amendment in U.S. Appl. No. 12/614,333, filed Nov. 1, 2012.
Non-Final Office Action in U.S. Appl. No. 12/830,861 mailed on Jun. 21, 2012.
Notice of Allowance in U.S. Appl. No. 11/578,420 mailed on Jan. 18, 2013.
Response to Non-Final Office Action dated Dec. 17, 2012 in U.S. Appl. No. 13/459,213, filed Mar. 18, 2013.
Response to Non-Final Office Action dated Dec. 7, 2012 in U.S. Appl. No. 13/459,216, filed Mar. 7, 2013.
Final Office Action in U.S. Appl. No. 13/459,216 mailed on Mar. 26, 2013.
Non-Final Office Action in U.S. Appl. No. 12/614,319 mailed on Feb. 7, 2013.
Response to Non-Final Office Action dated Dec. 12, 2012 in U.S. Appl. No. 12/614,326, filed Mar. 8, 2013.
Notice of Allowance in U.S. Appl. No. 12/614,326 mailed on Mar. 19, 2013.
Notice of Allowance in U.S. Appl. No. 12/614,333 mailed on Mar. 5, 2013.
Non-Final Office Action in U.S. Appl. No. 13/102,627 mailed on Mar. 28, 2013.
Request for Continued Examination and Amendment in U.S. Appl. No. 11/578,420, filed Apr. 18, 2013.
Response to Non-Final Office Action dated Jul. 2, 2013 in U.S. Appl. No. 12/614,319, filed May 7, 2013.
Final Office Action in U.S. Appl. No. 13/459,213 mailed on Jun. 11, 2013.
Request for Continued Examination in U.S. Appl. No. 12/614,333, filed Jun. 5, 2013.
Response to Non-Final Office Action dated Mar. 28, 2013 in U.S. Appl. No. 13/102,627, filed Jun. 17, 2013.

* cited by examiner

MOBILE DATA SECURITY SYSTEM AND METHODS

RELATED APPLICATION DATA

This application claims benefit of U.S. Provisional Application Ser. No. 60/656,541, filed on Feb. 28, 2005.

BACKGROUND OF THE INVENTION

The present invention relates generally to systems and method for securing a mobile computing system, and more particularly, to a system and method for enforcing security policy on mobile devices based on dynamic parameters.

Never has data, such as corporate data, been so mobile— and so prone to theft, loss or corruption. With more than 2 billion handheld devices (PDAs, Smart Phones, Blackberry's™, thumbdrives, iPods™, other handheld devices, etc) already in use, they are becoming more and more commonplace in the corporate environment. Many of these devices are purchased for personal use, but are finding their way into corporate environments and are being used to access corporate information. This changing IT landscape, sometimes referred to as "shadow" IT, is particularly acute at the "mobile edge" or the "perimeter"—the dynamically changing end points of an enterprise network where the type, platform and use of these devices is continuously changing and evolving.

These mobile devices have quickly become the productivity tools of choice for most knowledge workers. The devices are relied upon because of their immediate access to information, their small form factor and faster collection of information. However, such benefits come with tremendous financial, regulatory and brand risk. These devices, if unsecured, can be a primary source of infections via rogue access, data theft, and unsecured transfer of information and inadvertent release of confidential information. Increasingly they are also causing significant IT challenges and helpdesk headaches.

Effective management of these new risks is as critical as it is complex. The complexities lie in many area's of concern. Some analysts estimate that as many as 30% of these devices are lost per year (SANS Institute). The small form factor of these devices also creates new internal security threats due to their ability to be easily concealed. Gartner estimates that more than 70% of unauthorized access to information systems is committed by employees, as are more than 95% of intrusions that result in significant financial losses. Further, Gartner predicts that through 2006, 90 percent of mobile devices containing enterprise data will have insufficient power-on protection and storage encryption to withstand casual to moderate hacker attacks. This risk has led them to recommend that enterprises immediately start addressing their mobile storage risks.

Corporate enterprises are faced with the challenge of managing the balance between end user productivity, an appropriate level of data security while minimizing IT intervention. Organizations are asking if the solution is an extension of current vendors' solutions, or do they require a fresh approach that leverages security best practices empowered by software that can take advantage of knowing and understanding the dynamics at the mobile edge. The liabilities and risks associated with an unsecured mobile edge are growing. While enterprises look to leverage the competitive advantages and productivity gains associated with the introduction of smart phones and other mobile devices, the security risks continue to increase.

Legislation mandating the protection, management, or verification of financial data and personal information is forcing corporate action and accountability. Legislation stipulating the protection of personal data is commonplace, with penalties for failing to comply becoming increasingly severe. HIPAA, PIPEDA, GLBA, The Data Protection Act, SB1386, SOXA, are examples of regulations targeting organizations that deal in maintenance and transfer of sensitive corporate and consumer information.

Further, complicating this challenge is the general openness of the Microsoft Desktop environment. Now more than ever, every port, external disk drive, or memory stick can become a huge regulatory or financial risk. To confront these growing challenges some IT departments have turned to soldering and gluing USB ports to prevent intrusion, or putting titanium "chastity belts" around computers. Others are looking for more elegant ways to manage the risks associated with the inherent access to enterprise data. USB ports, for instance, can be used for a variety functions from input devices such as mice and keyboards to mobile data storage devices (capable of downloading gigabytes of data or uploading unapproved or malicious software). Devices as inconspicuous as iPods and other entertainment devices are now capable of not only downloading more than 30 GBs of data, they can also, unknown to the user and corporate IT, put aware and other potentially malicious software directly onto the users hard disk.

Mobile devices are key competitive tools in today's marketplace and business, as well as government agencies. These organizations must find ways to transparently apply the necessary security policies to them—to minimize knowledge worker productivity. One of the biggest challenges, the protection of sensitive data including client financial information and patient information, has many issues associated with it and requires a comprehensive solution to achieve the intended result.

Prior art security systems for networks commonly employs static, legacy-type and fixed policy-based approaches controlled from within an enterprise system for protecting data and network access to it. However, mobile communications devices having data storage and software applications create new challenges for network security, in particular because the portable mobile communications devices have a range of software, applications, functions and changes to their operating characteristics occur from time to time without authorization from the security system. A mobile device that is compliant with a security policy can be readily changed to present a security risk subsequent to policy compliance checking. For example, various peripherals can be connected to mobile devices, the devices can communicate with various public networks, and application software can be easily added to the devices.

Since mobile communications devices are intended to enhance productivity for mobile knowledge workers, access to the enterprise network and data stored on servers therein is important to ensuring their productivity. Thus, there remains a need for security systems and methods for mobile computing and communications devices operating on and connecting with enterprise networks and data, wherein security is based on static and dynamic security components to ensure device compliance with security policies.

SUMMARY OF THE INVENTION

The present invention is directed to security systems and methods for mobile network-based data environments. The present invention provides an integration of security, mobile computing, wireless and IT infrastructure management technology, to create a new level of automation and enforcement to enable the transparent application of mobile security across an enterprise, while embracing end user "transparency" and "ease of use" and empowering IT administration.

Accordingly, one aspect of the present invention is to provide a system for providing network security for mobile devices including: at least one mobile device having electronic data storage and software operability and capable of wireless communication on a network; a network constructed and configured for wireless communication between the at least one mobile device and at least one server computer; wherein the at least one server computer further includes a multi-layered (multi-mode) security system operable thereon to provide platform-independent security for controlling access to data stored on the at least one server computer, whereby the at least one mobile device is permitted access to the network and the data only if it operates in compliance with policies provided on the security system. The policies are based on dynamic parameters of the mobile device and its environment.

Another aspect of the present invention is to provide a method for providing network security for mobile devices comprising the steps of:
 a) providing a system as described hereinabove;
 b) providing initial security rules;
 c) providing initial authorization for at least one mobile device having a unique identifier and corresponding authorized user;
 d) the at least one device and corresponding authorized user attempting to access the network;
 e) the first security server determining status of device(s) using both static and dynamic information;
 f) if compliance is found, then the first security server providing access to the network and predetermined data thereon;
 g) if non-compliant device and/or user, then access denied device routed to a second server for remediation; wherein if remediation successful, then reintroduced to network or if remediation not successful, then complete access denied.

These and other aspects of the present invention will become apparent to those skilled in the art after a reading of the following description of the preferred embodiment when considered with the drawings.

DETAILED DESCRIPTION

Figure 1:
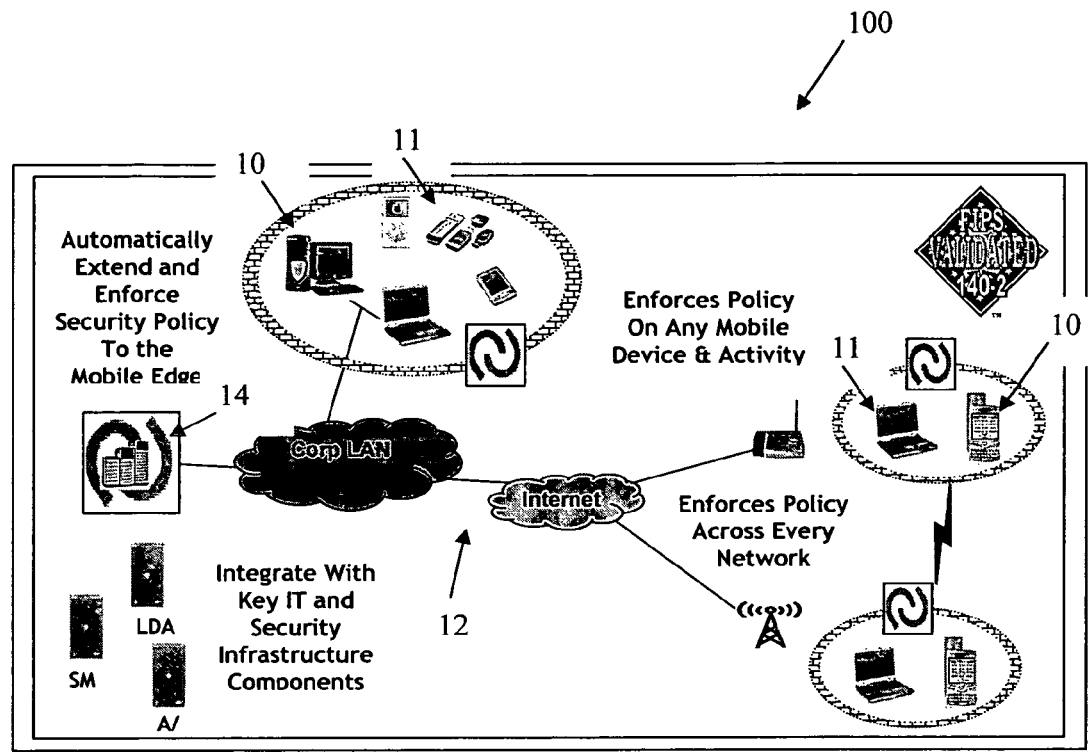
FIG. 1 is a schematic diagram of a system constructed according to the preferred embodiment.

In the following description, like reference characters designate like or corresponding parts throughout the several views. The illustrations are for the purpose of describing a preferred embodiment of the invention and are not intended to limit the invention thereto. As best seen in FIG. 1, a system 100 for providing network security for mobile devices includes: at least one mobile device 10 having electronic data storage and software operability and capable of (operable for) wireless communication on a network; a network 12 constructed and configured for wireless communication between the at least one mobile device 10 and at least one server computer 14; wherein the at least one server computer 14 further includes a multi-layered and/or multi-mode security system operable thereon to provide platform-independent security for controlling access to data stored on the at least one server computer 14. Security policies are stored on the server 14, and synchronized with the mobile device 10. Enforcement of the security policies permits the mobile device 10 to access the network 12 and the data only if it operates in compliance with policies provided on the security system.

Any of the at least one mobile devices 10 having corresponding authorized users function to operate in compliance with the security system when it has an authorized use status, which requires, among other things, that each device have an unique identifier and a corresponding authorized user. Additionally, the at least one mobile device 10 must operate within a compliant context, which is based on initial and ongoing compliance with security policies and/or rules as automatically verified whenever the device attempts to connect to the network and/or have access to data on the at least one server computer 14, and continuously while the device is connected to the network 12. This is accomplished through the policy synchronization process described below.

The compliant context includes multi-mode security components with both static and dynamic components, and includes, as an initial requirement, successful authentication of the at least one mobile device 10 and corresponding authorized user through a login-type process that can include user identification, a device identification, and user passcode to avoid denial of access. The compliant context preferably further includes an approved device structure, configuration, and/or software, and approved device functions, status and activities.

In preferred embodiments of the present invention, the security system provides a multi-mode security operation, including the static and dynamic components, wherein the combination of the static and dynamic components comprises a unique way of capturing device status in an instantaneous state structure (ISS). The ISS is based upon interaction of mobile device(s), users and other devices via a communications channel, such as a wireless network, and provides a set of information based on parameters such as the operating system, software application(s), device location, network information, and personality information, current use/activity compared with usage patterns for device and corresponding authorized user, and combinations thereof. The static components can include device serial number, device ESN, device manufacturer, and device model name. Dynamic components can include user name, user ID, user domain/group, device operating system (OS) name, device OS version, device ROM version, device peripherals list, device total memory, device free memory, application list and versions, applications currently running, registry setting snapshot (for relevant devices) date/time of last hard reset, date/time of last soft reset, date/time of last policy receipt, date/time of last OTA sync, date/time of last USB sync, date/time of last IR sync, date/time of last Bluetooth sync, policy number, network interface list and configuration, network names that interfaces are connected to, GPS lat/lon location information, and combinations thereof.

The security system also provides for at least one server that maintains a historical state structure (HSS), which is simply a historical archive of all ISS recordings made over time. It includes a database maintained in an enterprise infrastructure that contains data related to enterprise scans as well as mobile device vulnerability data. Also, the database includes an historical archive of ISS snapshots received from all mobile devices having had connection or authorization to connection with the network.

According to the present invention, the static security component provides legacy-type security. The dynamic security component, and the combination of both static and dynamic security components, is the unique method of capturing device status in this invention.

The security system also provides multi-layered operation, wherein the operations are selected from the group consisting of authentication for devices and corresponding authorized users, encryption for data, control of applications having access to the data, and protection of resources having data stored thereon, and combinations thereof.

In a preferred embodiment, a three-tiered system and methods are provided to ensure network and data security, including authentication, encryption, and control of applications on the mobile device(s) 10. The authentication requirement for each device and corresponding user ensures that each mobile device 10 has a unique, expected identifier that has previously been initialized and/or registered with the system through the administrator or other automated process, such that the system permits only "expected" devices and corresponding users as the principal actors having access to the network 12 and data stored within servers within the enterprise. The encryption of data on the at least one server 14 and on the devices 10 following data access provides for decryption only on authorized device(s) 10; encryption/decryption arrangements including public-private key security exemplify access to data following successful authentication. Also, the system provides for control of application(s), which operates to permit access to and decryption of data for predetermined software application(s) residing or operating on the at least one mobile device 10; non-compliant software resident and/or operating on the mobile device(s), even following successful authentication of the device and corresponding authorized user may function to prevent download or transfer of data, or at least prevent decryption of the data. Alternatively, the system operates to remove the device(s) from the network or redirect it to a remediation server where deletion or correction of the problem or offending software application is required prior to reintroduction to the network 12 and access to data previously permitted by the system for that device and corresponding user. Furthermore, if the system is operable to remove a device if it is identified as a data leakage threat, based upon device/user history, software application changes or functional changes in the device compared to expected or allowed protocols.

The use of the HSS permits another level of security in a dynamic manner. The HSS is essentially an archive of usage states of device 10 and associated users. The historical usage states can be compared with current usage states and patterns to determine usage anomalies that, while technically within a security policy, might want to be flagged and dealt with. For example, there may be no express policy limit on a number of messages sent by a device. However, when a device/user is currently sending thousands of messages per day and previously sent only a few messages per day, an indication of a virus or other malware can be implied. In such a case, the administrator might want to take manual or predetermined automated actions, such as to prohibit the device from connecting to the network until it has been scanned for viruses. Various changes in use states can be detected and flagged as anomalies. For example, device location, device peripherals, network connections, device users and the like.

Regarding system structure, the at least one server computer 14 includes a first security server for controlling access to the network and data, and a second security server for providing remediation activity for non-compliant mobile device(s) 10. Following an initial set-up by a security administrator, the security system provides for fully automatic enforcement of security policies for each of the at least one mobile device(s) 10 in wireless communication with the at least one server computer 14. Note that the system functions for mobile data storage devices that are not otherwise generally designed, constructed, or configured for communication functionality. Examples include thumb drives, removable portable storage devices for multi-media, including cameras, video, and entertainment, such as IPod portable digital storage device by Apple.

Following the initiation and updating of the system, when the security policy and/or rules are established and modified by a security administrator, the system and functions are automatic and continuous, due to the requirement for static and dynamic information from the at least one mobile devices 10. This automated, continuous multi-mode surveillance and enforcement provides context-based authorization for the mobile device(s) 10 and corresponding user(s), given the nature of the mobile device and its intended use for mobile access to the system network and data by authorized users across platforms and devices. To ensure the automated, continuous multi-mode surveillance and enforcement, the security policy and/or rules reside on at least one server, preferably at least a first and second security servers (with the second being segregated to quarantine non-compliant devices, and function to permit or restrict access to server(s) connected to the network and data for authorized access individual mobile device(s) 10.

In preferred embodiments, the system is operable with transparent enforcement such that the at least one mobile device(s) 10 receive a corresponding indication of security status. Preferably, the at least one mobile device(s) 10 and corresponding user(s) only receive an indication of/from the security system at predetermined interactions, including when the system makes a requirement for authentication input(s) and upon denial of access to the network for the unauthorized device.

With the system and methods of the present invention, access to the network 12 and/or data through the at least one security server is permitted based upon compliance with security policies and successful authentication of the at least one mobile device 10 and corresponding authorized user; alternatively, access the network 12 and/or data through the at least one security server is denied for non-compliant device(s), and the device connection is routed through a segregated server for remediation.

The system optionally further includes a system status visualization for providing a graphical representation of security risks.

The preferred embodiment also provides a method for providing network security for mobile devices comprising the steps of:
  a) providing the system as set forth hereinabove;
  b) providing initial security rules;
  c) providing initial authorization for at least one mobile device having a unique identifier and corresponding authorized user;
  d) the at least one device and corresponding authorized user attempting to access the network;

e) the first security server determining status of device(s) using both static and dynamic information;
f) if compliance is found, then the first security server providing access to the network and predetermined data thereon;
g) if non-compliant device and/or user, then access denied device routed to a second server for remediation
 if remediation successful, then reintroduced to network
 if remediation not successful, then complete access denied; and
h) repeating steps (e), (f) and/or (g).

The preferred embodiment provides a security system and methods for mobile devices having access to a network and data stored on servers within an enterprise, the security provided using an encryption solution and support of Trusted Applications in a mobile computing system. The system and method includes performing a full SHA-1 Hash of the Application Signature (with server support through image management), Application Access Rights (Read Only or Read & Write), and Protection of Encrypted Data When Copied/Moved to/through another "medium", and support for entire encryption library.

Applications selected to be able to access protected data have a SHA-1 hash signature created and validated at each attempt to run the application. Only the authorized applications that pass an integrity check can access protected data. Each time the application is run, it must first pass this signature test.

Signature applications are created in three (3) ways and the policy established by the system administrator determines which method is applied for that policy:
 1) Image Management—Using the image management functionality, a set of applications and their associated signatures are provided to the device per SOP.
 2) Current Device Applications—This method ensures that the signatures are created at the time the security software and policy are installed on the device.
 3) User Created Signatures—This method uses (2) plus allows the user to specify additional applications. When a new application is being launched, the system will ask the user if this is an approved application. If the user selects yes, then it will be updated on the system.

The preferred embodiment also includes trusted application access rights features that enable the administrator to provide specific read only or read and write access rights to trusted applications that wish to access protected data. A trusted application is a software application or program having preliminary or predetermined approval by the security administrator for the system. Similar to image management, a support function is operable to enable the administrator to create secure signatures for approved or trusted applications only. Any application which does not have or does not pass this secure signature check will not be allowed to run, i.e., the software program must be disabled, deleted, or rendered inoperable before the device upon which it is installed is permitted access to the network and/or data on the enterprise server.

A Security Encryption Library supports the AES 256 encryption, and may be extended to support entire encryption libraries to provide for secure transport of protected data across a network 12 including mobile communications and mobile data storage devices. When data is encrypted on the device(s) 10, a corresponding policy setting determine the state (clear text or encrypted) when the data is copied, moved, inserted as an attachment, transmitted or otherwise put onto a physical storage media or transmitted wirelessly, IR etc.

To provide for situations when protected data is copied to another device in any manner as described above, the administrator defines for the system which encryption method is used for particular situations. By way of example, the policy based upon the administrator's definition determines encryption method to be used and who should be granted access to that encrypted data. This requirement provides for pre-defined administrator and group access to protected data in a simple and easy way.

To effectively address the dynamic nature of today's mobile data threats, the embodiment preferably includes a preliminary assessment for understanding what comprises the mobile edge for a particular enterprise and then balance acceptable risk with minimizing end user productivity constraints; this is evidenced by the policies and/or rules established by the security administrator for the system.

By way of definition, a mobile edge of an enterprise network provides ingress (the ability to connect and transfer information in) and egress (the ability to connect and take information out) from/to the local workstation via non-Internet related features and capabilities. These end points include the multitude of mobile storage devices, as well as the various personal area network capabilities (Bluetooth, IR, etc) and finally the increasing number of personal productivity devices being used by today's knowledge worker. Organizations must create an "inventory" of devices 10 that have access to a corporate network, as well as have an understanding of the capabilities of those devices 10.

The enterprise can review current security practices and procedures (even if only written) to determine the acceptable risk posture and weigh these policies against the inventory of devices that can be gateways of potential data loss, theft or corruption. Since many of these devices 10 are not purchased by the organization and are outside of the current sphere of management and security control, it is recommended that end users be educated about the importance security on these devices 10, as well as transparently applying the necessary level of security to protect the enterprise and its data.

The present invention provides unprecedented mobile data protection independent of device, platform, application and network. It also provides an extensible framework that quickly adapts to new device types, environmental and physical changes and a plethora of malicious and accidental security risks.

Figure 2:
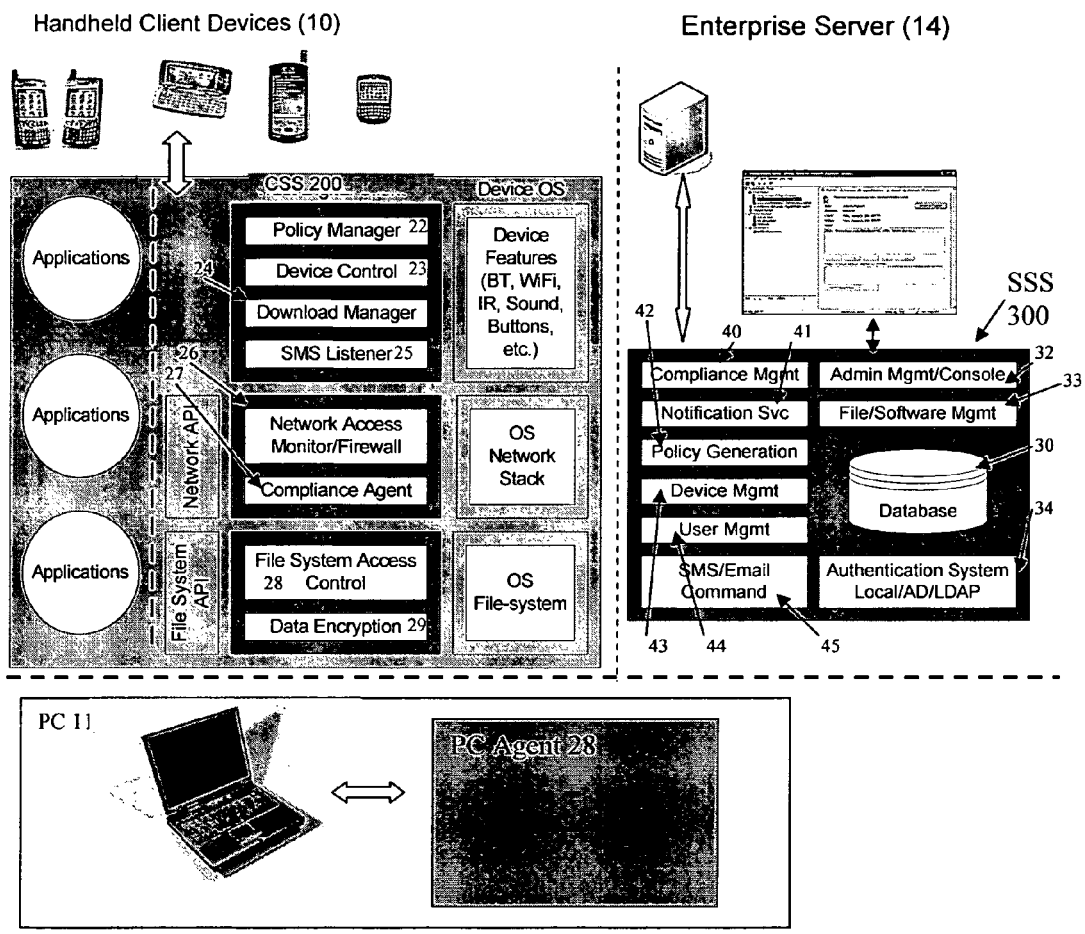
FIG. 2 is a schematic diagram of a system network architecture constructed according to a preferred embodiment of the present invention.

FIG. 2 shows a schematic view illustrative of an architecture of the system 100 of the mobile device and network security system according to the preferred embodiment. Server Security Software (SSS) 300 includes an Administration Management Console module 32 to enable centralized management of the organization's mobile security policies. From the Administration Management Console module 32, the system/security administrator can create a mobile device security policy, on a group and device specific basis, for storage in database 30. Subsequently, the security software and policies can be pushed to mobile devices 10. The Administration Management Console module 32 provides the interfaces for creating policy-based mobile security management from a central location, such as server 14.

Regarding the console configuration and set up, following the installation of the software on a server 14, a configuration wizard can walk a user through the console set up and automatically set several key parameters including:
 1. Master Administrator and Sub-Administrators and Passwords
 2. Console Password
 3. Enterprise Registration and Contact Information
 4. Enterprise Encryption Standards and Keys Once this is finished, the system can then automatically create default policies which can then be the baseline for creating additional policies as described below.

The Administration Management Console module 32 then allows the security administrator to create specific policies based on Groups and within each Group the ability to define policies by device type. These groups can also be tied directly to directory services infrastructure as described below.

The CSS 300 is installed on the server 14 and includes Compliance Management module 40 that compares information in incoming (from device 10) ISS structures to security policy information stored in database 30 to determine whether a requesting mobile device 10 is compliant with a security policy or not. Compliance Management module 40 also communicates with Compliance Agent Module 26 on CSS 200 (described below). Notification Service module 41 logs service alerts and provides the same to console users as security alerts and also manages the writing of events logs. Notification Service module 41 also provides event streams to security event management and security information management systems.

Policy Generation module 42 creates encrypted XML security policy files based on administrator input from the Administration Management Console module 32. Also Policy Generation module 42 generates "on-the-fly" automated policies based on security events. Device Management module 43 manages communication with mobile devices 10 to exchange policy files and maintains device identities as manipulated by the Administration Management Console module 32 and communicates with the Policy Manager module 22 on the CSS 200. User Management module 44 manages user identities as manipulated by the Administration Management Console module 32 and as integrated with Active Directory/LDAP via the Authentication System/LDAP module 34.

SMS/E-Mail Command module 45 manages the SMS and e-mail communication conduits with mobile devices 10 and communicates with the SMS Listener module 25 on CSS 200. Administration Management Console module 32 manages the interface between the SSS 300 and the security administrator. File/Software Management: module 33 maintains the creation, storage, and maintenance of the policy files and the security software packages that are created by the Policy Generation module 42. File/Software Management module 33 also manages the storage and transfer of files outside of the security policy file to mobile devices 10 and communicates with Download Manager module 24 on the CSS 200.

Database 30 is responsible for the storage of all ISS reports in the historical state structure (HSS) and for storage of all policy information, device and user identity information, reporting information, and all other data maintained by the system. Authentication System module 34 maintains the interface between the SSS 300 and external authentication/directory systems, interfaces with Active Directory, LDAP, local authentication resources, and other 3rd party authentication systems.

The SSS 200 also provides the direct links into the enterprise infrastructure including integration with directory services, through Authentication System module 34. An SDK which defines the interfaces to this service is also available for third party console integration capabilities. The SSS 300 automates the creation, distribution, management and enforcement of mobile security policies based on the dynamics state of the mobile devices 10 and current temporal activities happening at the mobile edge of the network.

Through the Administrative Console module 32 it is a very simple process to link the SSS 300 with an AD or LDAP compliant directory services infrastructure in a known manner. The systems and methods of the present invention quickly associate multiple AD groups to platform specific mobile security policies and then manage any associated changes directly through an existing management console. All changes within a Directory Services group are automatically reflected in the policies stored in database 30, at the next policy synchronization as described below.

Each mobile device 10 can be associated with a user PC 11 (see FIG. 1). The PC Agent 28 is a software module running on PC 11 and manages and enforces the PC security policy to provide real-time intrusion prevention—assuring that only authorized devices synchronize or connect to the PC (whether the PC is on-line or offline). The PC Agent provides intrusion prevention by enforcing the PC Policy that defines authorized mobile device types (based on operating system, applications, peripherals and other capabilities as defined on the administration console). The PC Agent also performs the following functions:

Automatically prevents unauthorized PDA and other USB devices (even when PC is offline)

Receives policies and software downloads from the administration console server

Pushes policies, mobile client software and other software as defined by the policy to connecting mobile devices.

The PC Agent is capable of and operable to be deployed to network PCs using standard software distribution applications such as SMS.

The PC Agent software resides on a desktop or PC and runs as a protected service in the local memory of that PC. When mobile device 10, such as, a PDA or other USB device, attempts to connect or sync (via a cradle attached to the PC), the PC Agent 28 looks for the presence of the CSS 200 or device 10 before allowing any further action. If it does not find the CSS, the PC Agent will take action, in accordance with its security policy. Actions can range from do nothing and allow the unknown device to connect or sync, monitor and record what the unknown device is doing, or upload the CSS 200 to the mobile 10 device, along with the default security policy.

The Client Security Software (CSS) 200 manages and enforces the mobile device security policy based on a set of policies to govern the device, application and peripheral access as well as the encryption requirement on the local device. The CSS 200 is the secure client program for the present invention that runs on mobile devices 10 and provides the access control and encryption functions.

The CSS 200 supports the following features:

Device access control

Data encryption

FIPS certified algorithms (Triple DES, AES (128, 192, 256 bits) & SHA-1)

FIPS approved random number generation

Access control of peripheral usage including SD cards, IR, Bluetooth, USB ports

Event log collection

Support for application management

Packet Filter firewall for Pocket PC

Policy Manager module 22 manages the constant population of the instantaneous state structure (ISS) as it relates to the changing state of the device over time. Also manages the storage and maintenance of policy files as received from the Device Management module 43 on the SSS 300. Device Control module 23 interprets the current security policy file and enforces device related security decisions. This may include things like disabling the camera of device 10, allowing the use of Bluetooth only for headsets, etc. Download Manager module 24 manages the download of applications and files outside of normal policy transfer. The download manager module 24 is used for the installation of new software as remotely defined in the Administration Management Console module 32 on the SSS 300 and communicates directly with the File/Software Management module 33 on the SSS 300.

SMS Listener module 25 listens for SMS messages or e-mail messages from the SMS/E-mail Command module 45 on the SSS 300. When it receives a command from the server, it can pass on commands to any module on the CSS 200 to take appropriate action. Examples would be "immediately wipe device", "reset user password", etc. Network Access Monitor/Firewall module 26 serves as a mobile device firewall protecting the mobile device 10 from attack as well as enforcing usage restrictions and guidelines as defined in the current security policy file. Compliance Agent module 27 enforces and reports on compliance of the device 10 based on compliance parameters set in the current security policy file.

File System Access Control module 28 enforces trusted application decisions as defined in the current security policy file and ensures that only trusted applications can make file system requests of encrypted and secure data. Data Encryption module 29 encrypts and decrypts data with parameters (algorithm, key length, etc) as defined in the current security policy file.

The CSS 200 is a cross-platform mobile security and management solution that provides a policy-based framework to automate the creation, deployment, enforcement, auditing and control of security policies at the mobile edge. This unique enterprise policy-based mobility security solution automates the creation, deployment, enforcement, auditing and control of security policies at the mobile edge of an enterprise network from a central console. This enables users to continue to bring personal devices into the office but automates the creation and distribution of the security software and policies without IT intervention. CSS 200 can also be operative to log historical activity of mobile device 10 through unique forensic analysis and lock out rogue devices, such as devices that are used periodically in an insecure manner.

The preferred embodiment provides a visualization output for analysis and reporting for illustrating a Mobile Edge Vulnerability Analysis (MEVA). MEVA provides a way to visually understand mobile data risks and vulnerabilities. This goes beyond traditional scanning or inventory management solutions and provides both a historical view of handheld device access on a network as well as a listing of potential mobile data vulnerabilities on both PCs and PDAs connecting to the network. With this information in hand, it is no longer a guessing game on how to apply mobile security policies but rather a decision on enforcement.

This analysis accomplished without installing software directly on desktop PCs but can require administrative privileges on the networked PCs to capture the results. The present invention leverages a unique process of forensically analyzing "breadcrumbs"—various file, registry, log, and other information—to create a historical view of all PDA activity from individual PCs (whether or not the sync software is still resident on the PC). Additionally, MEVA provides information on other mobile data vulnerabilities. This information allows network and security administrators to make faster and more intelligent decisions regarding the deployment of mobile security policies.

Below is some additional information on the type of information that MEVA captures as part of this process.

| | |
|---|---|
| PC Vulnerability Analysis | Reports on PC and Laptop configurations including: PC Vendor Registry, System & File Information Peripherals and Drives Sync Software File System Information Connected Devices |
| Mobile Device Vulnerability Analysis | Reports on PDA, Smart Phone and other device connectivity including Palm, Pocket PC, MS Smartphone, RIM, and Symbian devices providing: Platform Applications Asset & File System Information Expansion Slots Peripherals including Bluetooth, IR, SD card and other communication and storage capabilities. |

This forensic capability can also be used to support litigation efforts and other research on user activity either from the PCs or historical back ups.

In a preferred embodiment of the invention, the security system software includes standard reports (a sample of which is provided below). Preferably, the reports, illustrated in FIG. 6, include both standardized and customizable formats for representing a range of enterprise security systems and their mobile device deployment.

There are two basic options for collecting data without installing software on the end user PC. The preferred method is to have the network administrator add a discovery application to the domain login script. This application executes in the local memory of the PC during login and then exits and provides information back to our server (transparently to the user). A second method is to use the "task scheduler" function within Windows OS; however, this not only requires the administrator to set up, it also requires task scheduler to be active on all desktops, which is not always the case.

The application for operating within the present invention is provided in a shared directory that can be access by all PCs within the network. The login script contains a line which shows the path of the executable file.

Figure 4:
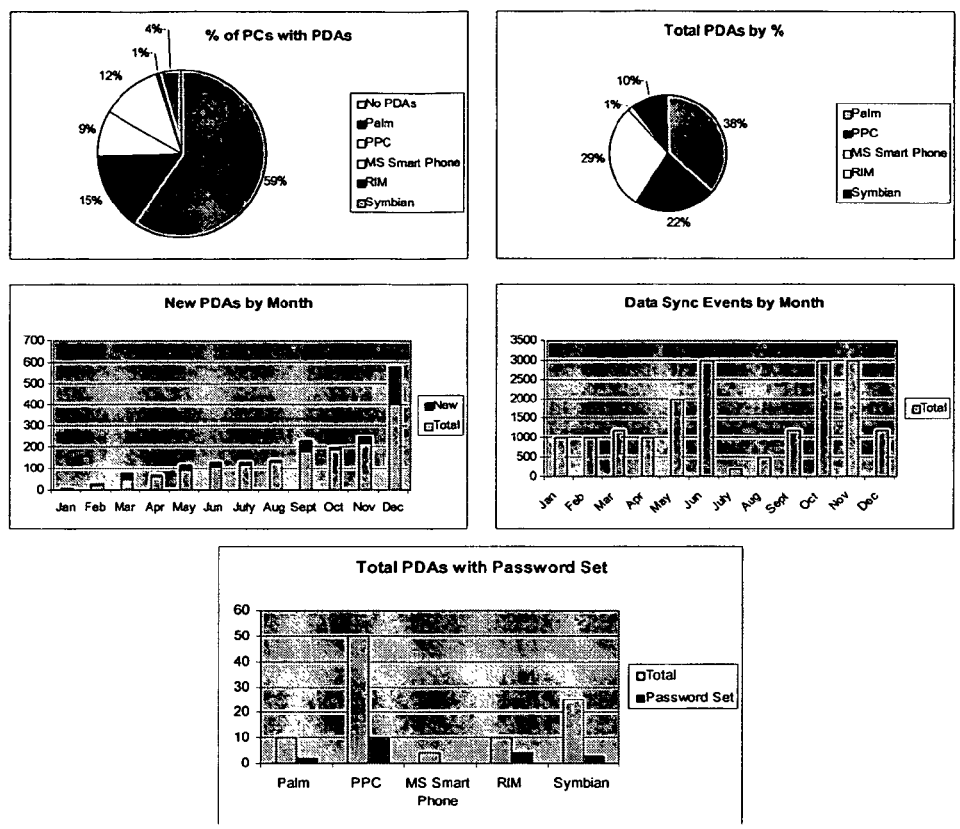
FIG. 4 shows different views for visualization of reports for a system according to the preferred embodiment.

The discovery application communicates the information back to the security server and is stored in a specified database. The server is operable to support both SQL and Access databases. Thus, it should have very minimal impact on network traffic and has no impact on the local PC performance or use of other applications. FIG. 4 illustrates examples of reports that can be created.

Creating appropriate mobile security policies are similar to standard operating procedures for enterprise security officers. Using sound, time-tested, good security practices, along with the knowledge of your known risks, you can now easily extend corporate security polices policies to the mobile edge with minimal IT intervention. The preferred embodiment provides best practices templates to reduce the time and energy required to create mobile security policies and ensures that when changes are needed they are very low maintenance. Further, the embodiment leverages relevant security and provisioning information contained in existing IT infrastructure systems including Directory Services (LDAP/AD) to enable management of key group and policy parameters from your existing consoles and management processes. Based on the knowledge from the vulnerability analysis, the policies that are created are now driven by corporate compliance requirements and risk profile.

Policy Components

To create the appropriate mobile edge security policies, the preferred embodiment facilitated creation of platform specific policies across any type of mobile devices 10. Components of a typical mobile edge security policy are illustrated in the table below.

| Level Of Security | Network Admission | User Authentication | Application Management | Mobile Device Policy | Data Protection |
|---|---|---|---|---|---|
| High, Medium, Low | Device Type and associated attributes and any time/date restrictions (Authorized Sync and Port | Password length, composition, expiration, entry method, etc and any time/date restrictions | Required Software, Image Lock, Trusted Applications | Peripherals Access and Use plus Firewall configuration | Data types to encrypt and SD card protection. |
| Product Component(s) | Authorized Sync & Port Protect | Console Password Tab | Console Advanced Feature Tab | Console Device Restrictions Tab | Console Encryption Tab |

Figure 3A:
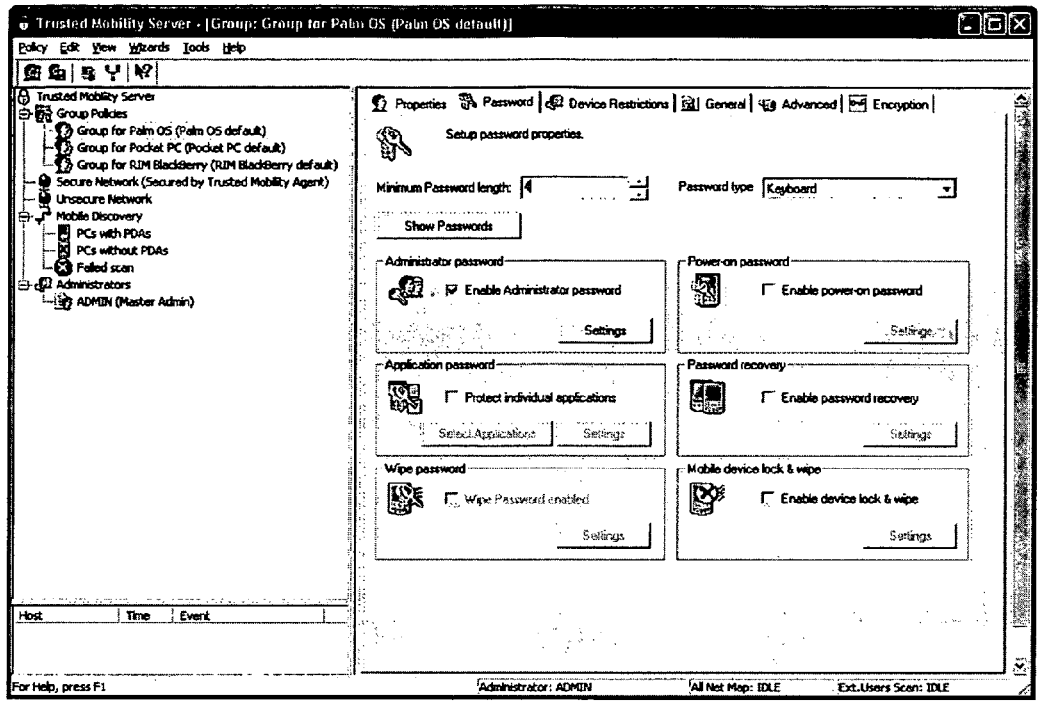
FIGS. 3A-3E are screen shots of an administrative console user interface according to the preferred embodiment.
Figure 3B:
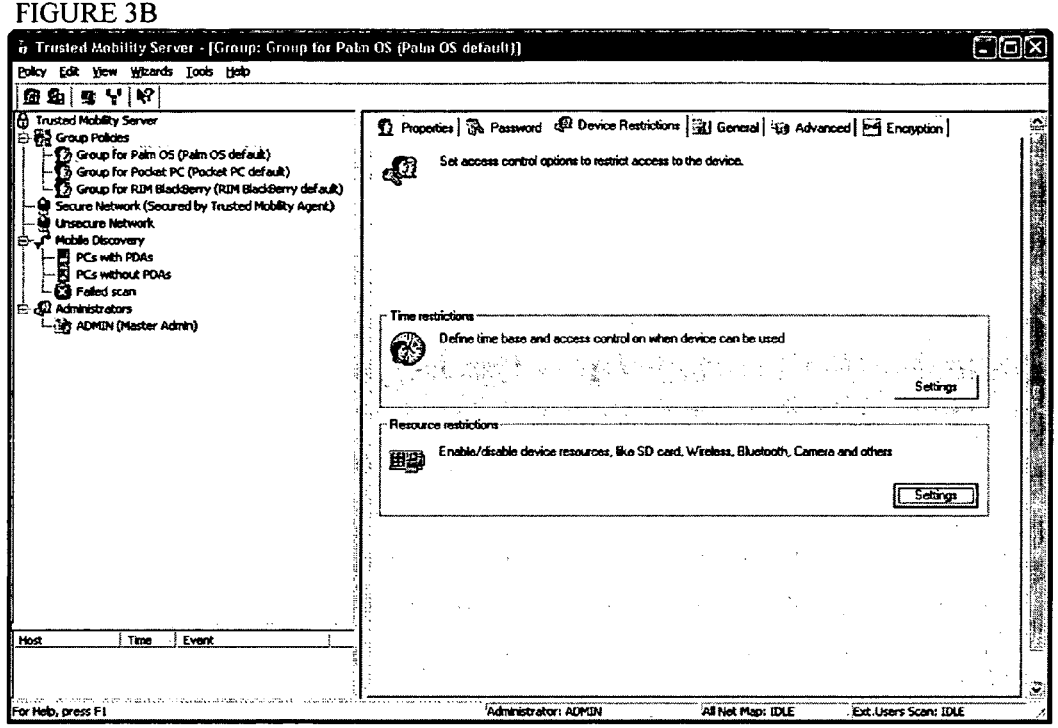
Figure 3C:
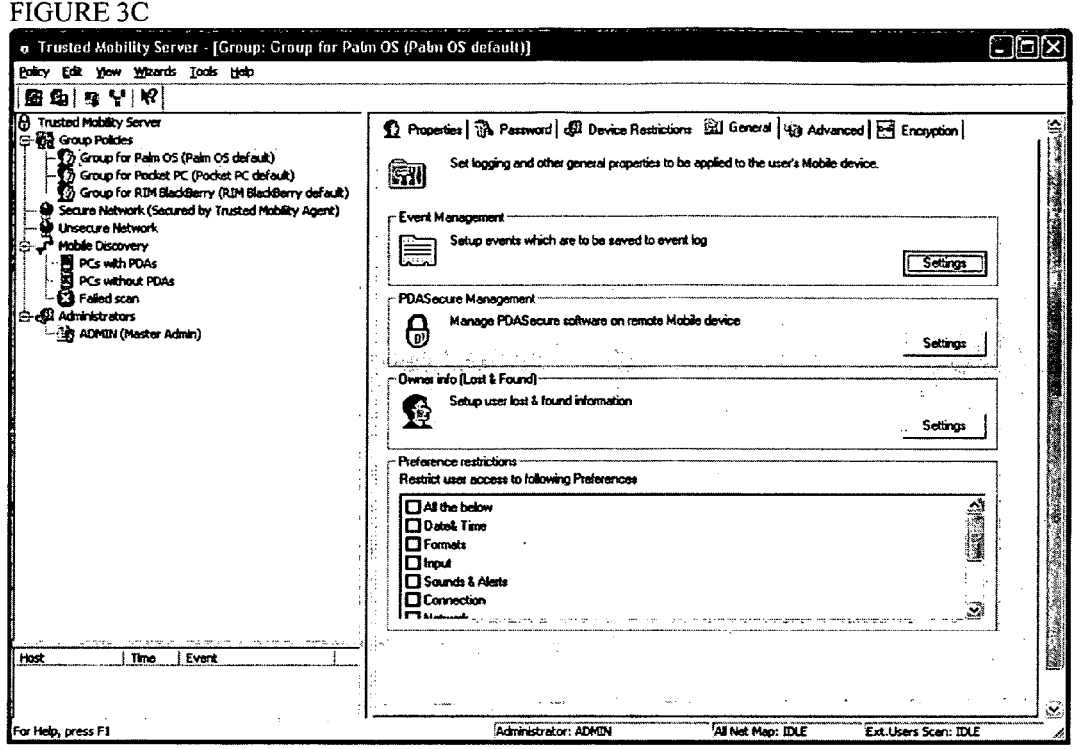
Figure 3D:
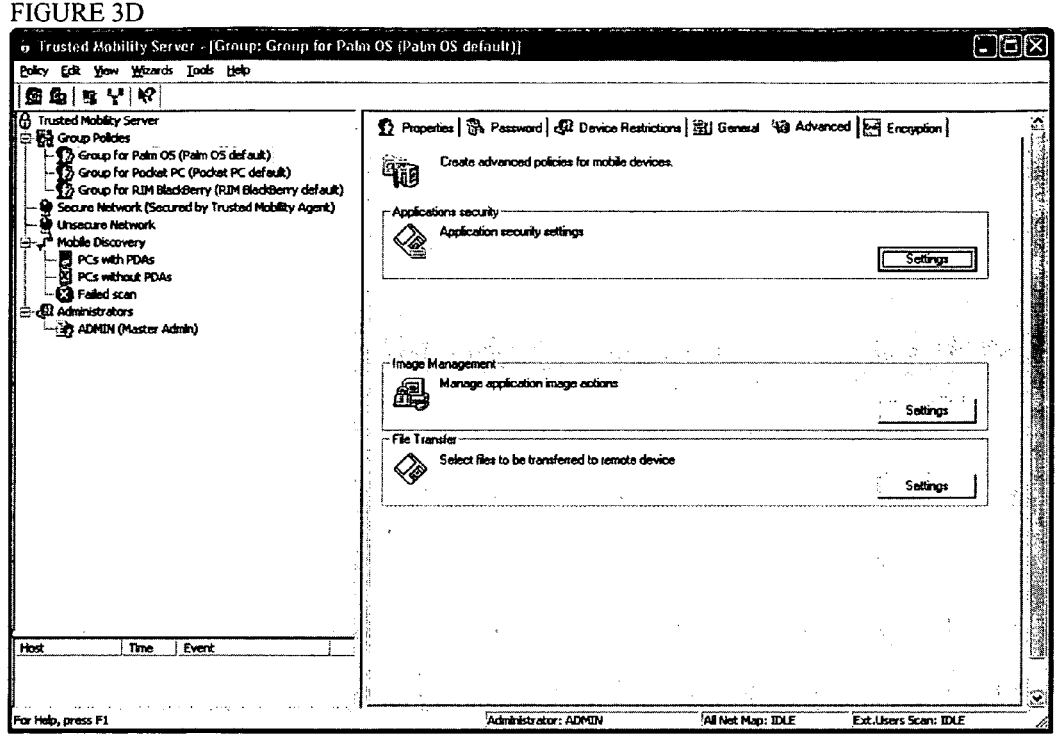
Figure 3E:
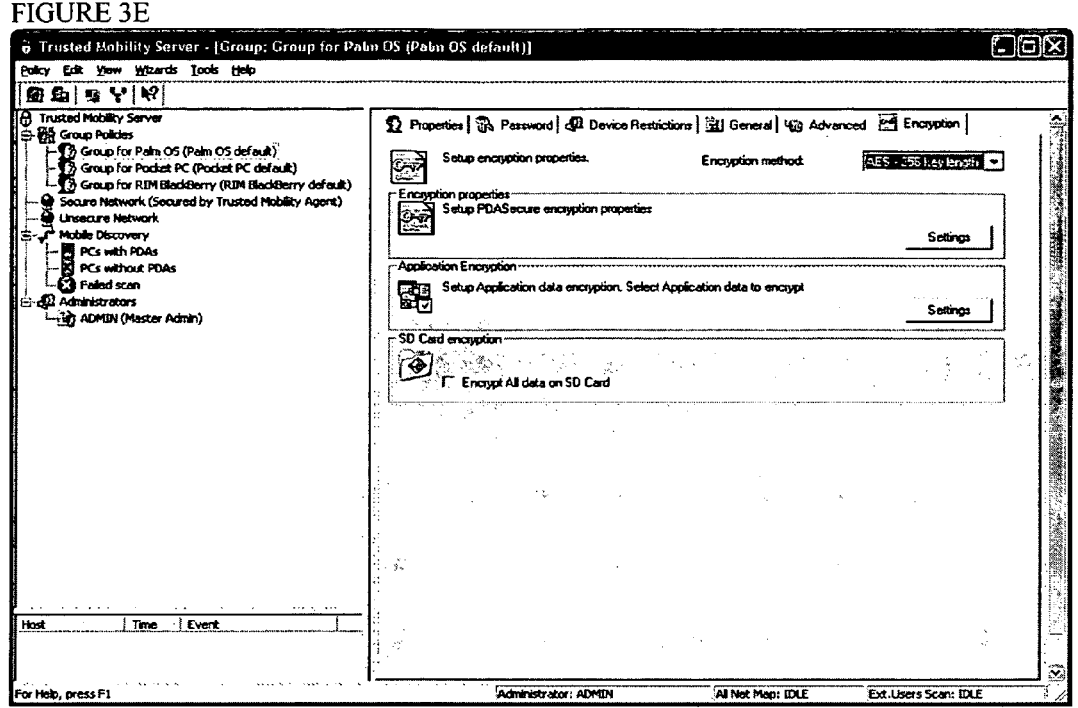

FIGS. 3A-3E illustrates a user interface for security policy creation. As illustrated in FIG. 3A, various password options can be set as part of the policy. As illustrated in FIG. 3B, device restrictions can be set. Such restrictions can be temporal and can relate to available device resources. As illustrated in FIG. 3C various event information, such as information to be logged, and preference restrictions can be set. As illustrated in FIG. 3D, application security, image management, and file transfer options can be set. As illustrated in FIG. 3E, encryption options can be set. All of these options and parameters can then be incorporated into a policy and enforcement mechanism in a known manner.

The system enables the appropriate policy enforcement based on the type of device and the specific mobile data risk associated with these devices. Policies can be created for any computing platform including the following platforms:

Windows 2000 and XP (including network admission restrictions and USB port protection)

Palm (3.x, 4.x and 5.x)

Pocket PC 2002 and 2003 (Phone Edition and Second Edition)

MS Smartphone

Windows Mobile 5

RIM (Java-enabled Devices)

Symbian

As devices attempt to connect to PCs within the system, whether they are on-line or offline, the set of policy parameters below enables the system to only allow "trusted" mobile devices 10 (PDAs, Smartphones and other device types that meet enterprise admission criteria). The admission criteria can include dynamic parameters such as how the device 10 is being used, how the device 10 was used historically, and the current environment in which the device 10 is being used.

| | |
|---|---|
| Admission Control | This feature describes the requirements of a non-PC handheld device who wishes to connect to the network (wireless) or PC |
| Sync Authorization | This features determines the characteristics of PDAs approved for use on your network including Device OS, Vendor, Installed Software, Time Restrictions and other parameters |
| PC USB Port Restrictions | This feature provides a tool to restrict access to the USB port based on specific device class or by specific device type. |

User Authentication

| | |
|---|---|
| User Authentication | This set of policy features describes the user authentication requirements for the device including password management parameters. |
| Password Entry Method | This defines the process for entering a password including Keyboard, PIN or Pictures. |
| Power On Password | This is the password which provides access to the device at power on and during Idle time outs. The parameters for this are managed by the items below. |
| Minimum Password Length | This defines the minimum number of characters and/or pictures which are required as part of the power on password. |
| Password Parameters | This option defines the requirements password construction (alpha, alpha numeric, special keys or characters) |
| Password Expiration | This feature determines the length of time a password is valid, after which the user is forced to change their password. The new password must follow the password parameters defined for that policy as well as the password history requirements defined by the administrator. |

The preferred embodiment is capable of integrating the user authentication method and parameters to existing infrastructure including Directory Services (AD/LDAP) and other authentication technologies (PKI, Secure ID, Biometrics, etc.)

Application Management & Device Configuration

| | |
|---|---|
| Application Management | This set of policy features describes the acceptable use and installation policies regarding software and related preferences. |
| Application Protection Global Application Password Individual Application Password | This feature provides the ability to provide additional levels of protection and management regarding access and use of applications. It provides the ability to have a global password for all applications or local passwords for each individual application. |
| Image Management | This feature enables the administrator to determine what an acceptable software image (all software including OS) for a device should be. This allows the administrator to "freeze configuration or have the ability to define a 'golden master" which should be used. The image can be updated based on specific times or at each sync. |
| Preference Restrictions | This feature enables the administrator to set the preferences for various applications and features for each devices and then choose whether to lock them or not as part of the policy |

-continued

| | |
|---|---|
| Application Management | This set of policy features describes the acceptable use and installation policies regarding software and related preferences. |
| Allow New Applications | This feature describes the ability to add new applications to a device once the TD software has been installed. If the policy disallows new software to be added, the Trust Digital software will delete it immediately. |
| Application Protection Integrity Check Data Access Rights | This feature enables the administrator to select specific applications that can access protected/encrypted data. Each "Trusted" application is then "signed" and undergoes a validity check each time it attempts to run. |

Device Policy

Once a mobile device 10, such as, a PDA or Smartphone, has been allowed to access data from the enterprise or corporate network, there are a number of options to control what peripherals and resources the device can use based on security administrator concerns about accidental or malicious data exposure.

Depending on the platform and the device type, the table below provides a representative example of the types of peripherals and resources that can be restricted.

| | |
|---|---|
| Device Policy v1 | This set of policy features describes the access rights and restrictions relating to non-software functions and peripherals. |
| Peripheral and Port Restrictions | This feature provides a listing of all peripheral and port capabilities of the device type and enables the administrator to allow access, prevent access based on approved device white list |
| Time Restrictions | This feature enables the administrator to set specific day of week and time period restrictions on accessing the device. When the device is out of range of acceptable time periods the appropriate message should be displayed. |

Lost & Stolen Devices

| | |
|---|---|
| Lost & Stolen Devices | This set of policy features helps eliminate data theft and also provides a set of parameters should devices become lost or stolen. |
| Idle Lock | This policy feature describes the amount of idle time that transpires before the Power on Password screen is displayed. This time may be more or less than the idle time power down on the device. In any event, if the idle lock time has transpired or the device goes to sleep itself, the system will display the Power On Password before the device can be used further. |
| Sync Inactivity Lock/Wipe | This policy feature describes the amount of time that transpires without an data processing or synchronization activity happening on the device that transpires before additional actions are taken by the device based on the policy. |
| Password Failure | This describes the number of tries a user is allowed to enter a password before additional action (Lock or Wipe) is taken. |
| Enable Forgot Password | This allows an administrator to choose from a group of pre-determined set of questions which the user must answer in order to re-set the password in question. Based on the questions selected as part of the policy, a user will be prompted to |

-continued

| | |
|---|---|
| Lost & Stolen Devices | This set of policy features helps eliminate data theft and also provides a set of parameters should devices become lost or stolen. |
| | answer these questions as part of either the initial start up process on the device or immediately following the next successful login if it is part of an updated policy. An option to access this is available on the Power Up Password screen. |
| Wipe Password | This password is designed to enable the user to select a password to self destruct the device and all its data. If selected as part of a policy, the user will be prompted to enter the wipe password during the initial startup up process on the device or immediately following the next successful login if it is part of an updated policy. |
| Remote Unlock (1× challenge) | This option should be displayed on the Power-On Password Screen and enables the user to read the administrator a long number and then have the administrator read back a long number as well to unlock the device. This should accessible from the Power on password screen as well as instances where the device has been lock (idle or activity locks) where the action is to lock and not wipe the device. |

The preferred embodiment further provides on-the-fly encryption capabilities and operability that maximizes user compliance and minimizes data theft and loss. An administrator has rights to quickly define the type of information and databases (All, PIM, Specific *.ext and/or designated databases), or even the entire device, to be encrypted. This ensures that the data is always encrypted on the mobile device 10 and that only "Trusted" applications can access the data. This eliminates the threat of worms, viruses, Trojan horses and unapproved applications recklessly or maliciously accessing important information. These same encryption capabilities can also be applied to storage peripherals such as SD cards; again with no user interaction and no need to create special files or folders. Finally, this approach is application, device and network agnostic and therefore is even natively compatible with all enterprise sync vendors and sync methods ((PC sync, device-initiated, IP Push).

| | |
|---|---|
| Encryption Preferences | This option enables the user to select the target file types or other data options that should be encrypted as part of a given policy. The specific algorithm and encryption key are managed at a global level. |

| ALGORITHM | FIPS-Validated | NON-FIPS |
|---|---|---|
| Triple DES | X | |
| AES | X | |
| SHA1 | X | |
| HMAC-SHA1 | X | |
| RNG | X | |
| Twofish | | X |
| Blowfish | | X |
| RC4 | | X |
| TEA | | X |
| XOR | | X |
| MD5 | | X |

The storage module 24 provides the capability and operability to encrypt data on removable storage media on one type of mobile device (e.g., Pocket PC) and move the data on that storage device for processing on one or more other types of devices (e.g., laptop, Palm, desktop). The data remains protected throughout the moves and is able to be decrypted and utilized on each of the devices to which the media is moved. The storage module 24:

Provides portable data encryption

Facilitates easy transfer of information between mobile device 10 and PC 11 a Enables other authorized users to open stored files and view/modify contents on different platforms and operating systems Works on PDAs and SmartPhones, as well as laptop, tablet and desktop PCs Network interface module 26 includes a wireless firewall. It provides a small footprint (only about 150 Kb of memory), and provides the following functionality:

Enable/disable and change security settings without re-booting the device

Multiple security profiles, default policy, rules customization based on specific settings and time restrictions as well as direction of data flow (inbound or outbound)

Security logs

Supports rules for TCP, UDP, and IP, as well as ICMP events.

Host blocking and content filter

The administrator also has several options available to them both at policy creation and at any time moving forward based on a policy group or individual user including:

Force Password Change at Next Logon

Re-Set Power-On Password

Re-Set Wipe Password

One configuration for the systems and methods of the present invention leverages the PC Agent 28 for software distribution, policy distribution and updates, registration process and non-device specific remote services. Distribution can be accomplished during synchronization via a USB port or wireless connection.

Another configuration uses an enterprise sync server such as Intellisync™ for software and policy distribution. Non-device specific remote services are updated through polices via the 3rd party conduit. In some cases the initial software distribution is done manually as well.

Still another configuration provides the ability to send either an SMS message or email the policy group and individual users to support software distribution, policy distribution and updates, registration process and non-device specific remote services.

Exemplary Technical Specifications for operating the system and methods of a preferred embodiment of the present invention:

| Data Center Server | Server Operating System: Microsoft Windows 2003 Server, Microsoft Windows 2000 Server, Microsoft 2000 Advanced Server, Windows Server NT4<br>Hardware: Pentium IV, 1.2 GHz or higher, 10/100 Mbit LAN interface, RAID 5 (Recommended)<br>Software: Microsoft Active Directory or other LDAP compliant Directory Service, ODBC Authentication, Active X Data Objects, MS Access or MS SQL, TCP/IP protocol stack, IE 6.0 or higher<br>rMemory: 256 Mb (up to 500 users), 512 Mb (500–1000 users), 1 Gb (>1000 users)<br>Disk Storage: 1 Mb (Application), 3 Gb (100 users), 15 Gb (500 users), 30 Gb (1000 users) |
|---|---|
| PC | Operating System: Windows 98/Me/NT/XP/2000/2003.<br>Hardware: Pentium III, 800 Mhz or higher, 10/100 Mbit LAN interface<br>Software: TCP/IP protocol stack, IE 6.0 or higher<br>Memory: 128 Mb minimum<br>Disk Storage: 1 Mb (Application), 100 Mb (Data) |
| Mobile Device Clients | Operating System(s): Palm 3.5 and higher, Pocket PC 2002 and 2003, Windows Mobile 2003, Windows Mobile 2003 Second Edition, Symbian OS 6.0, RIM (C version), RIM (Java Version in near future)<br>Disk Storage: 350 Kb memory space |

Feature Listing

| Features | Benefits |
|---|---|
| Real-Time Policy Creation and Updating | Real-time creation and updating of mobile security policies each time it connects to the PC - even when the PC is offline. Automatically creates and distributes the most recent policy and Trust Digital software directly to the device before allowing it to sync. |
| Policy-based Security | Centralized design and management of group and device based policies as well as PC policies managed and monitored via the TD Network Agent |
| Secure XML Policy Creation | Creates secure policies that can then be distributed to PCs and Devices through existing systems and software management tools, synchronization software, FTP servers and other methods. |
| Device Access Control | Supports enterprise wide standards for password management and other use restriction as well as administrative override capabilities if device is lost or stolen or user's password is forgotten. |
| Software Management | Key component of policy management for defining software standards including software image, application access, installation and deletion as well as application specific encryption requirements. |
| Real Time Intrusion Detection and Prevention | Enables real-time intrusion prevention and detection by defining authorized devices and preventing other devices from connecting. |
| Real-Time Asset Information Collection | Integrates directly with Trust Mobile Discovery to provide real-time mobile asset information collection including mobile device characteristics and related resource utilization. |
| Event Logging | Provide administrators with event data of key mobile-related events and mobile device and related resource utilization. Captures pre-designated events on mobile device and ensure reporting back to central event management and logging capability on server. |
| Encryption Options | Provides support for the most comprehensive platform support for FIPS-142 validated algorithms for Windows, Palm, and PPC. Trust Digital's FIPS 140-2 encryption library including AES, Triple-DES, SHS, and HMAC-SHA-1 algorithms for the following platforms:<br>Windows NT SP6, 2000, XP Pro<br>Palm OS 4.1, 5.2.1, 5.2.1H<br>Pocket PC - 3.0, 4.20<br>MS Smartphone 2002 |
| Peripheral Control | Enforces policies associated with access and use of mobile device peripherals including cameras, IR, Bluetooth, SD cards and more. |
| Password Management Features | Case Sensitivity<br>Alpha, Numeric, Alpha-Numeric<br>Minimum Length<br>Expiration and Inactivity settings<br>Password Management (Lost/Forgotten, Number of Retries, Overrides, Wipe Conditions, Lock-Out, etc.) |

Figure 5:
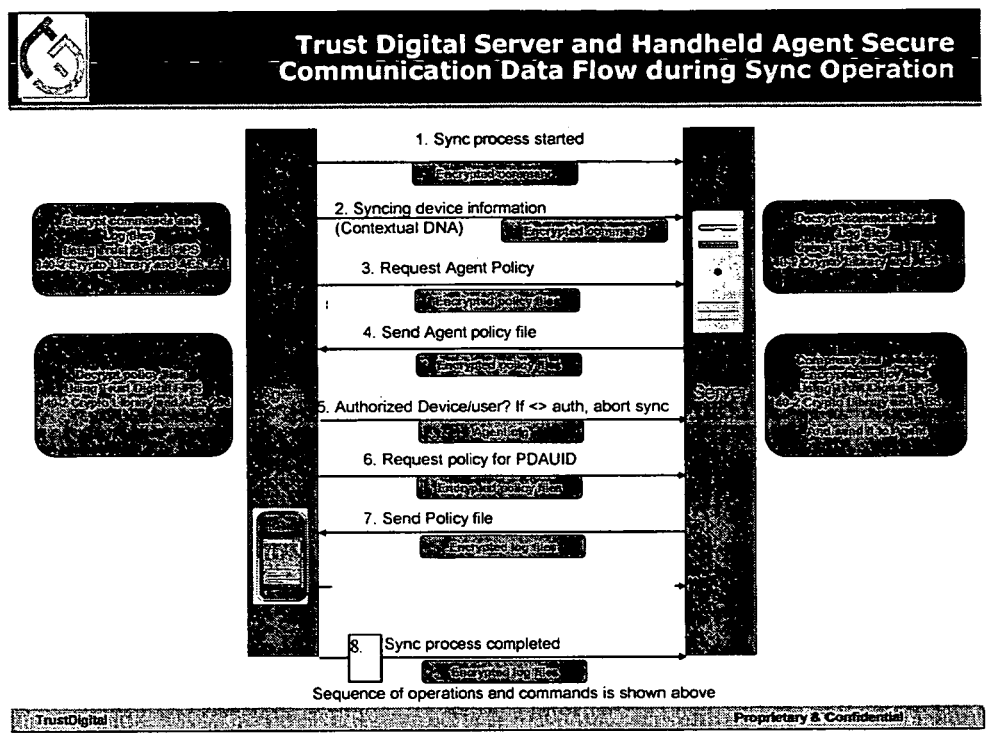
FIG. 5 is a flow diagram showing a method of synchronizing security profiles on a mobile device according to the preferred embodiment.

FIG. 5 illustrates the policy synchronization process of the preferred embodiment whereby a device is authenticated, a user is authorized, and the appropriate policies are installed on the mobile device 10. The example in FIG. 5 is a synchronization between server 14 and mobile device 10. However, as noted above, the policy synchronization can be accomplished using the PC 11 as a mediator, such as during a data synchronization between the PC 11 and the mobile device 10.

In step 1, CSS 200 sends a request to SSS 300 to initiate the process. In step 2, device information, such as the current state of the device 10, expressed as an ISS for example, is transmitted from the device 10 to the server 14. In step 3, CSS 200 requests from SSS 300 a generic policy, stored in database 30, for the type of device 10. In step 4, the policy is sent from server 14 to device 10 in encrypted form. In step 5, CSS 200 authenticates the user of mobile device 10, through requesting a password, biometric data, or the like. Authentication of the user is based on the device policy sent in step 4. In step 6, a user specific policy is requested from server 14 and in step 7, the user specific policy is sent to device 10 based on the authentication of step 5. In step 8, the process is completed.

It can be seen that the policy synchronization process accounts for dynamic information of the device by using the ISS. Also, the policy is tailored to the specific user of the device in a dynamic manner.

Certain modifications and improvements will occur to those skilled in the art upon a reading of the foregoing description and such modifications and improvements are within the scope of the invention as defined by the appended claims. The policies and other data structures can be stored at any location and in any format. For example, the policies can be stored in a standard database format such as Microsoft Access format. The policies can be stored in the enterprise server or at a third party service provider location. Synchronization and distribution of policies and other information can be accomplished in any known manner. The invention can be applied to any mobile device, such as a handheld computing device. Any communications channels can be used. The invention can be accomplished with various computing environments and operating systems. Various static and dynamic parameters can be collected stored, monitored and processed to effect security.

What is claimed is:

1. A method comprising:
    transferring a user specific policy to a mobile device based on authentication of a corresponding authorized user, wherein the user specific policy is synchronized with mobile device policies of a security system in a network;
    detecting an attempt by the mobile device to access the network;
    obtaining a state structure of the mobile device, wherein the state structure provides a set of information including static and dynamic mobile device information based on parameters, the parameters including one or more of an operating system, a software application, a device location, network information, personality information, and a current usage state, wherein the state structure is populated by the mobile device as a state of the mobile device changes over time;
    determining whether the mobile device complies with a static security policy based on the static mobile device information of the state structure;
    determining whether the mobile device complies with a dynamic security policy based on the dynamic mobile device information of the state structure; and
    comparing a historical usage state of the mobile device to the current usage state of the mobile device to determine a usage anomaly, which reflects a level of current e-mail messages being higher than historical levels of e-mail messages being sent by the mobile device, wherein if the mobile device fails to comply with at least one of the static security policy and the dynamic security policy, then access to the network is denied until the mobile device undergoes a virus scan, wherein compliance with the dynamic security policy is verified continuously while the mobile device is connected to the network.

2. The method of claim 1, wherein the static mobile device information includes at least one of a phone number or a device ESN.

3. The method of claim 1, wherein the dynamic mobile device information includes at least one of user ID, user domain/group, device operating system name, device operating system version, device ROM version, device peripherals list, device total memory, device free memory, application list and versions, applications currently running on the mobile device, registry setting snapshot, date/time of last hard reset, date/time of last soft reset, date/time of last policy receipt, date/time of last OTA sync, date/time of last USB sync, date/time of last IR sync, date/time of last Bluetooth sync, policy number, network interface list and configuration, network names that interfaces are connected to, GPS location information, and combinations thereof.

4. The method of claim 1, wherein a server computer maintains a historical state structure based on prior instances of the state structures of the mobile device.

5. The method of claim 4, further comprising comparing the state structure of the mobile device to the historical state structure of the mobile device to identify changes in the state structure of the mobile device relative to the historical state structure of the mobile device.

6. The method of claim 1, further comprising monitoring the mobile device to identify variations in at least one of the static device information of the mobile device and the dynamic device information of the mobile device.

7. The method of claim 6, further comprising determining whether any of the identified variations in the static device information of the mobile device or the dynamic device information of the mobile device cause the mobile device to be non-compliant with either of the static security policy or the dynamic security policy.

8. The method of claim 7, further comprising restricting access of the mobile device to the network if the identified variations in the static device information of the mobile device or the dynamic device information of the mobile device cause the mobile device to be non-compliant with either of the static security policy or the dynamic security policy.

9. The method of claim 1, further comprising creating a visualization of one or more security risks associated with the mobile device, wherein the security risks are determined from at least one of the static device information and the dynamic device information.

10. The method of claim 9, wherein the visualization comprises a graphical representation of the security risks associated with the mobile device.

11. The method of claim 1, further comprising running a discovery program to identify the mobile device, wherein the discovery program identifies mobile devices that are connected to, or are attempting to connect to, the network.

12. The method of claim 1, wherein compliance with the dynamic security policy requires that the mobile device have an authorized use status.

13. The method of claim 12, wherein the authorized use status requires that the mobile device has a unique identifier and an authorized user.

14. A system comprising:
a device management module for identifying a mobile device in communication with a network, the system being configured for:
transferring a user specific policy to a mobile device based on authentication of a corresponding authorized user, wherein the user specific policy is synchronized with mobile device policies of a security system in a network,
obtaining a state structure of the mobile device including static mobile device information and dynamic mobile device information based on parameters, the parameters including one or more of an operating system, a software application, a device location, network information, personality information, and a current usage state, wherein the state structure is populated by the mobile device as a state of the mobile device changes over time; and
a compliance management module for:
determining whether the mobile device complies with a static security policy based on the static mobile device information,
determining whether the mobile device complies with a dynamic security policy based on the dynamic mobile device information,
comparing a historical usage state of the mobile device to the current usage state of the mobile device to determine a usage anomaly, which reflects a level of e-mail messages being higher than historical levels of e-mail messages being sent by the mobile device, wherein if the mobile device fails to comply with at least one of the static security policy and the dynamic security policy, then access to the network is denied until the mobile device undergoes a virus scan, wherein compliance with the dynamic security policy is verified continuously while the mobile device is connected to the network.

15. The system of claim 14, wherein the static mobile device information includes at least one of a phone number or a device ESN.

16. The system of claim 14, wherein the dynamic mobile device information includes at least one of user ID, user domain/group, device operating system name, device operating system version, device ROM version, device peripherals list, device total memory, device free memory, application list and versions, applications currently running on the mobile device, registry setting snapshot, date/time of last hard reset, date/time of last soft reset, date/time of last policy receipt, date/time of last OTA sync, date/time of last USB sync, date/time of last IR sync, date/time of last Bluetooth sync, policy number, network interface list and configuration, network names that interfaces are connected to, GPS location information, and combinations thereof.

17. The system of claim 14, wherein at least one of the static mobile device information and the dynamic mobile device information includes information about a user of the mobile device.

18. The system of claim 14, wherein a database maintains a historical state structure based on prior instances of the state structures of the mobile device.

19. The system of claim 18, wherein the compliance management module compares the state structure of the mobile device to the historical state structure of the mobile device to identify changes in the state structure of the mobile device relative to the historical state structure of the mobile device.

20. The system of claim 14, wherein the device management module monitors the mobile device to identify variations in at least one of the static device information of the mobile device and the dynamic device information of the mobile device.

21. The system of claim 20, wherein the compliance management module determines whether any of the identified variations in the static device information of the mobile device or the dynamic device information of the mobile device cause the mobile device to be non-compliant with either of the static security policy or the dynamic security policy.

22. The system of claim 21, wherein the compliance management module restricts access of the mobile device to the network if the identified variations in the static device information of the mobile device or the dynamic device information of the mobile device cause the mobile device to be non-compliant with either of the static security policy or the dynamic security policy.

23. The system of claim 14, further comprising a visualization means for creating a visualization of one or more security risks associated with the mobile device, wherein the security risks are determined from at least one of the static device information and the dynamic device information.

24. The system of claim 23, wherein the visualization comprises a graphical representation of the security risks associated with the mobile device.

25. The system of claim 14, wherein the device management module executes a discovery program to identify the mobile device, wherein the discovery program identifies mobile devices that are connected to, or are attempting to connect to, the network.

26. A method comprising:
transferring a user specific policy to a mobile device based on authentication of a corresponding authorized user, wherein the user specific policy is synchronized with mobile device policies of a security system in a network, wherein the user specific policy includes an application security policy, the application security policy including an identification of trusted applications;
detecting an attempt by the mobile device to access the network;
obtaining a state structure of the mobile device, wherein the state structure includes static and dynamic mobile device information based on parameters, the parameters including one or more of an operating system, an identified software application, a device location, network information, personality information, and a current usage state, wherein the state structure is populated by the mobile device as a state of the mobile device changes over time;
comparing a historical usage state of the mobile device to the current usage state of the mobile device to determine a usage anomaly, which reflects a level of e-mail messages being higher than historical levels of e-mail messages being sent by the mobile device;
determining whether the application is compliant with an application security policy;
if the identified application is determined to be compliant with the application security policy, allowing the mobile device to run the identified application, wherein if the identified application fails to comply with the application security policy, then the identified application is prohibited from running on the mobile device until the mobile device undergoes a virus scan,
wherein compliance with the application security policy is verified continuously while the mobile device is connected to the network.

27. The method of claim 26, wherein the step of determining includes:
- performing a SHA-1 hash of the identified application to obtain a hash associated with the identified application;
- comparing the hash of the identified application with a corresponding hash included with the identification of the trusted applications; and
- if the hash of the identified application matches the corresponding hash included with the identification of the trusted applications, determining the identified application to be compliant.

28. The method of claim 26, further comprising dynamically verifying the compliance of the identified application each time the mobile device attempts to run the identified application.

29. The method of claim 26, wherein, if the identified application is determined to be in compliance with the application security policy, the identified application is identified as a trusted application.

30. The method of claim 29, further comprising granting the trusted application access rights.

31. The method of claim 30, wherein the access rights include at least one of read only or read and write access rights.

32. The method of claim 29, further comprising providing a secure signature to the trusted application.

33. At least one non-transitory computer readable medium having instructions stored thereon, the instructions when executed by a processor cause the processor to:
- transfer a user specific policy to a mobile device based on authentication of a corresponding authorized user, wherein the user specific policy is synchronized with mobile device policies of a security system in a network;
- detect an attempt by the mobile device to access the network;
- obtain a state structure of the mobile device, wherein the state structure provides a set of information including static and dynamic mobile device information based on parameters, the parameters including one or more of an operating system, a software application, a device location, network information, personality information, and a current usage state, wherein the state structure is populated by the mobile device as a state of the mobile device changes over time;
- determine whether the mobile device complies with a static security policy based on the static mobile device information of the state structure;
- determine whether the mobile device complies with a dynamic security policy based on the dynamic mobile device information of the state structure; and
- compare a historical usage state of the mobile device to the current usage state of the mobile device to determine a usage anomaly, which reflects a level of current e-mail messages being higher than historical levels of e-mail messages being sent by the mobile device, wherein if the mobile device fails to comply with at least one of the static security policy and the dynamic security policy, then access to the network is denied until the mobile device undergoes a virus scan, wherein compliance with the dynamic security policy is verified continuously while the mobile device is connected to the network.

34. The medium of claim 33, wherein the instructions when executed by the processor further cause the processor to monitor the mobile device to identify variations in at least one of the static device information of the mobile device and the dynamic device information of the mobile device.

35. The medium of claim 34, wherein the instructions when executed by the processor further cause the processor to determine whether any of the identified variations in the static device information of the mobile device or the dynamic device information of the mobile device cause the mobile device to be non-compliant with either of the static security policy or the dynamic security policy.

36. The medium of claim 34, wherein the instructions when executed by the processor further cause the processor to restrict access of the mobile device to the network if the identified variations in the static device information of the mobile device or the dynamic device information of the mobile device cause the mobile device to be non-compliant with either of the static security policy or the dynamic security policy.

37. The medium of claim 33, wherein the instructions when executed by the processor further cause the processor to run a discovery program to identify the mobile device, wherein the discovery program is configured to identify mobile devices that are connected to, or are attempting to connect to, the network.

* * * * *